(12) United States Patent  (10) Patent No.: US 7,584,417 B2
Friend et al.  (45) Date of Patent: Sep. 1, 2009

(54) ROLE-DEPENDENT ACTION FOR AN ELECTRONIC FORM

(75) Inventors: Ned B. Friend, Seattle, WA (US); Petru M. Moldovanu, Redmond, WA (US); Jane T. Kim, Seattle, WA (US); Miladin Pavlicic, Aachen (DE); Shiraz J. Cupala, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 10/988,718

(22) Filed: Nov. 15, 2004

(65) Prior Publication Data

US 2006/0107197 A1   May 18, 2006

(51) Int. Cl.
    *G06F 17/00*  (2006.01)
(52) U.S. Cl. .................. 715/224; 715/221; 715/223
(58) Field of Classification Search .................. 715/505, 715/506, 507, 508, 513, 530, 780, 856, 862, 715/977, 222–226, 234, 255
    See application file for complete search history.

(56) References Cited

U.S. PATENT DOCUMENTS

| | | | |
|---|---|---|---|
| 4,201,978 A | 5/1980 | Nally | |
| 4,498,147 A * | 2/1985 | Agnew et al. | 715/530 |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,926,476 A | 5/1990 | Covey | |
| 4,933,880 A | 6/1990 | Borgendal et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |
| 5,206,951 A | 4/1993 | Khoyi et al. | |
| 5,218,672 A | 6/1993 | Morgan et al. | |
| 5,220,649 A | 6/1993 | Forcier | |
| 5,222,160 A | 6/1993 | Sakai et al. | |

(Continued)

FOREIGN PATENT DOCUMENTS

EP   0841615   11/1999

(Continued)

OTHER PUBLICATIONS

Microsoft Corporation, "Microsoft Computer Dictionary" Microsoft Press, Fifth Edition, p. 149.

(Continued)

*Primary Examiner*—Doug Hutton
*Assistant Examiner*—James H Blackwell

(57) ABSTRACT

Systems and/or methods that enable creation and/or use of an action for an electronic form dependent on a role of a user are described.

12 Claims, 12 Drawing Sheets

U.S. PATENT DOCUMENTS

| | | |
|---|---|---|
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A * | 4/1995 | Tondevold et al. .......... 715/507 |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,133 A | 9/1997 | Malamud et al. |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A * | 12/1997 | Wright, Jr. .................. 715/505 |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A * | 4/1998 | Turpin et al. ................. 715/763 |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A * | 7/1998 | Gipson ....................... 715/530 |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,905,492 A | 5/1999 | Straub et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,065,043 A | 5/2000 | Domenikos et al. |
| 6,069,626 A | 5/2000 | Cline et al. |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |

| | | | | | | | |
|---|---|---|---|---|---|---|---|
| 6,084,585 | A | 7/2000 | Kraft et al. | 6,367,013 | B1 | 4/2002 | Bisbee et al. |
| 6,088,708 | A | 7/2000 | Burch et al. | 6,369,840 | B1 | 4/2002 | Barnett et al. |
| 6,091,417 | A | 7/2000 | Lefkowitz | 6,369,841 | B1 | 4/2002 | Salomon et al. |
| 6,094,657 | A | 7/2000 | Hailpern et al. | 6,374,402 | B1 | 4/2002 | Schmeidler et al. |
| 6,096,096 | A | 8/2000 | Murphy et al. | 6,381,742 | B2 | 4/2002 | Forbes et al. |
| 6,098,081 | A | 8/2000 | Heidorn et al. | 6,381,743 | B1 | 4/2002 | Mutschler, III |
| 6,105,012 | A | 8/2000 | Chang et al. | 6,389,434 | B1 | 5/2002 | Rivette et al. |
| 6,108,637 | A | 8/2000 | Blumenau | 6,393,456 | B1 | 5/2002 | Ambler et al. |
| 6,108,783 | A | 8/2000 | Krawczyk et al. | 6,396,488 | B1 | 5/2002 | Simmons et al. |
| 6,115,646 | A | 9/2000 | Fiszman et al. | 6,397,264 | B1 | 5/2002 | Stasnick et al. |
| 6,121,965 | A | 9/2000 | Kenney et al. | 6,405,221 | B1 | 6/2002 | Levine et al. |
| 6,122,647 | A | 9/2000 | Horowitz et al. | 6,405,238 | B1 | 6/2002 | Votipka |
| 6,144,969 | A | 11/2000 | Inokuchi et al. | 6,408,311 | B1 | 6/2002 | Baisley et al. |
| 6,151,624 | A | 11/2000 | Teare et al. | 6,414,700 | B1 | 7/2002 | Kurtenbach et al. |
| 6,154,128 | A | 11/2000 | Wookey et al. | 6,421,070 | B1 | 7/2002 | Ramos et al. |
| 6,163,772 | A | 12/2000 | Kramer et al. | 6,421,656 | B1 | 7/2002 | Cheng et al. |
| 6,167,521 | A | 12/2000 | Smith et al. | 6,421,777 | B1 | 7/2002 | Pierre-Louis |
| 6,167,523 | A | 12/2000 | Strong | 6,425,125 | B1 | 7/2002 | Fries et al. |
| 6,182,094 | B1 | 1/2001 | Humpleman et al. | 6,429,885 | B1 | 8/2002 | Saib et al. |
| 6,182,095 | B1 * | 1/2001 | Leymaster et al. .......... 715/515 | 6,434,563 | B1 | 8/2002 | Pasquali et al. |
| 6,188,401 | B1 | 2/2001 | Peyer | 6,434,564 | B2 | 8/2002 | Ebert |
| 6,191,797 | B1 | 2/2001 | Politis | 6,442,563 | B1 | 8/2002 | Bacon et al. |
| 6,192,367 | B1 | 2/2001 | Hawley et al. | 6,442,755 | B1 | 8/2002 | Lemmons et al. |
| 6,195,661 | B1 | 2/2001 | Filepp et al. | 6,446,110 | B1 | 9/2002 | Lection et al. |
| 6,199,204 | B1 | 3/2001 | Donohue | 6,449,617 | B1 | 9/2002 | Quinn et al. |
| 6,209,128 | B1 | 3/2001 | Gerard et al. | 6,457,009 | B1 * | 9/2002 | Bollay ........................ 707/10 |
| 6,216,152 | B1 | 4/2001 | Wong et al. | 6,460,058 | B2 | 10/2002 | Koppolu et al. |
| 6,219,698 | B1 | 4/2001 | Iannucci et al. | 6,463,419 | B1 | 10/2002 | Kluss |
| 6,225,996 | B1 | 5/2001 | Gibb et al. | 6,470,349 | B1 | 10/2002 | Heninger et al. |
| 6,235,027 | B1 | 5/2001 | Herzon | 6,473,800 | B1 | 10/2002 | Jerger et al. |
| 6,243,088 | B1 | 6/2001 | McCormack et al. | 6,476,828 | B1 | 11/2002 | Burkett et al. |
| 6,253,366 | B1 | 6/2001 | Mutschler, III | 6,476,833 | B1 | 11/2002 | Moshfeghi |
| 6,253,374 | B1 | 6/2001 | Dresevic et al. | 6,477,544 | B1 | 11/2002 | Bolosky et al. |
| 6,263,313 | B1 | 7/2001 | Milsted et al. | 6,480,860 | B1 | 11/2002 | Monday |
| 6,266,810 | B1 | 7/2001 | Tanaka et al. | 6,487,566 | B1 | 11/2002 | Sundaresan |
| 6,268,852 | B1 | 7/2001 | Lindhorst et al. | 6,490,601 | B1 * | 12/2002 | Markus et al. ............... 715/507 |
| 6,272,506 | B1 * | 8/2001 | Bell ........................ 715/507 | 6,493,702 | B1 | 12/2002 | Adar et al. |
| 6,275,227 | B1 | 8/2001 | DeStefano | 6,501,864 | B1 | 12/2002 | Eguchi et al. |
| 6,275,599 | B1 | 8/2001 | Adler et al. | 6,502,101 | B1 | 12/2002 | Verprauskus et al. |
| 6,279,042 | B1 | 8/2001 | Ouchi | 6,502,103 | B1 | 12/2002 | Frey et al. |
| 6,281,896 | B1 | 8/2001 | Alimpich et al. | 6,505,200 | B1 | 1/2003 | Ims et al. |
| 6,282,709 | B1 | 8/2001 | Reha et al. | 6,505,230 | B1 | 1/2003 | Mohan et al. |
| 6,282,711 | B1 | 8/2001 | Halpern et al. | 6,505,300 | B2 | 1/2003 | Chan et al. |
| 6,286,033 | B1 | 9/2001 | Kishinsky et al. | 6,507,856 | B1 | 1/2003 | Chen et al. |
| 6,292,897 | B1 | 9/2001 | Gennaro et al. | 6,516,322 | B1 | 2/2003 | Meredith |
| 6,292,941 | B1 | 9/2001 | Jollands | 6,519,617 | B1 | 2/2003 | Wanderski et al. |
| 6,297,819 | B1 | 10/2001 | Furst | RE38,070 | E | 4/2003 | Spies et al. |
| 6,300,948 | B1 | 10/2001 | Geller et al. | 6,546,546 | B1 | 4/2003 | Van Doorn et al. |
| 6,307,955 | B1 | 10/2001 | Zank et al. | 6,546,554 | B1 | 4/2003 | Schmidt et al. |
| 6,308,179 | B1 | 10/2001 | Petersen et al. | 6,549,221 | B1 | 4/2003 | Brown et al. |
| 6,308,273 | B1 | 10/2001 | Goertzel et al. | 6,549,878 | B1 | 4/2003 | Lowry et al. |
| 6,311,271 | B1 | 10/2001 | Gennaro et al. | 6,549,922 | B1 | 4/2003 | Srivastava et al. |
| 6,314,415 | B1 | 11/2001 | Mukherjee | 6,553,402 | B1 | 4/2003 | Makarios et al. |
| 6,321,259 | B1 | 11/2001 | Ouellette et al. | 6,560,616 | B1 | 5/2003 | Garber |
| 6,321,334 | B1 | 11/2001 | Jerger et al. | 6,560,620 | B1 | 5/2003 | Ching |
| 6,327,628 | B1 | 12/2001 | Anuff et al. | 6,560,640 | B2 | 5/2003 | Smethers |
| 6,331,864 | B1 | 12/2001 | Coco et al. | 6,563,514 | B1 | 5/2003 | Samar |
| 6,342,907 | B1 | 1/2002 | Petty et al. | 6,571,253 | B1 | 5/2003 | Thompson et al. |
| 6,343,149 | B1 | 1/2002 | Motoiwa | 6,578,144 | B1 | 6/2003 | Gennaro et al. |
| 6,343,302 | B1 | 1/2002 | Graham | 6,581,061 | B2 | 6/2003 | Graham |
| 6,343,377 | B1 | 1/2002 | Gessner et al. | 6,584,469 | B1 | 6/2003 | Chiang et al. |
| 6,344,862 | B1 | 2/2002 | Williams et al. | 6,584,548 | B1 | 6/2003 | Bourne et al. |
| 6,345,256 | B1 | 2/2002 | Milsted et al. | 6,585,778 | B1 | 7/2003 | Hind et al. |
| 6,345,278 | B1 * | 2/2002 | Hitchcock et al. ........... 707/100 | 6,589,290 | B1 * | 7/2003 | Maxwell et al. ............. 715/507 |
| 6,345,361 | B1 | 2/2002 | Jerger et al. | 6,598,219 | B1 | 7/2003 | Lau |
| 6,347,323 | B1 | 2/2002 | Garber et al. | 6,603,489 | B1 * | 8/2003 | Edlund et al. ................ 715/780 |
| 6,349,408 | B1 | 2/2002 | Smith | 6,604,099 | B1 | 8/2003 | Chung et al. |
| 6,351,574 | B1 | 2/2002 | Yair et al. | 6,606,606 | B2 | 8/2003 | Starr |
| 6,353,926 | B1 | 3/2002 | Parthesarathy et al. | 6,609,200 | B2 | 8/2003 | Anderson et al. |
| 6,356,906 | B1 | 3/2002 | Lippert et al. | 6,611,822 | B1 | 8/2003 | Beams et al. |
| 6,357,038 | B1 | 3/2002 | Scouten | 6,611,840 | B1 | 8/2003 | Baer et al. |
| 6,366,907 | B1 | 4/2002 | Fanning et al. | 6,611,843 | B1 | 8/2003 | Jacobs |
| 6,366,912 | B1 | 4/2002 | Wallent et al. | 6,613,098 | B1 | 9/2003 | Sorge et al. |

| | | |
|---|---|---|
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 * | 10/2003 | Rutten et al. ............... 715/530 |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 * | 11/2003 | Kennedy et al. ............ 715/507 |
| 6,654,737 B1 | 11/2003 | Nunez |
| 6,654,932 B1 * | 11/2003 | Bahrs et al. ................. 715/507 |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 * | 3/2004 | Weber et al. ................ 715/507 |
| 6,704,906 B1 * | 3/2004 | Yankovich et al. .......... 715/505 |
| 6,711,679 B1 | 3/2004 | Guski et al. |
| 6,720,985 B1 * | 4/2004 | Silverbrook et al. ........ 715/863 |
| 6,725,426 B1 | 4/2004 | Pavlov |
| 6,728,755 B1 | 4/2004 | de Ment |
| 6,735,721 B1 | 5/2004 | Morrow et al. |
| 6,748,385 B1 | 6/2004 | Rodkin et al. |
| 6,751,777 B2 | 6/2004 | Bates et al. |
| 6,754,874 B1 * | 6/2004 | Richman ..................... 715/507 |
| 6,757,868 B1 * | 6/2004 | Glaser et al. ................ 715/513 |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,876,996 B2 | 4/2005 | Czajkowski et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,133 B2 | 9/2005 | Haley |
| 6,948,135 B1 | 9/2005 | Ruthfield et al. |
| 6,950,980 B1 * | 9/2005 | Malcolm ..................... 715/505 |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,722 B2 | 2/2006 | Rothchiller et al. |
| 7,010,580 B1 | 3/2006 | Fu et al. |
| 7,020,869 B2 | 3/2006 | Abriari et al. |
| 7,024,417 B1 | 4/2006 | Russakovsky et al. |
| 7,032,170 B2 * | 4/2006 | Poulose et al. .............. 715/513 |
| 7,036,072 B1 | 4/2006 | Sulistio et al. |
| 7,039,875 B2 | 5/2006 | Khalfay et al. |
| 7,051,273 B1 * | 5/2006 | Holt et al. ................... 715/506 |
| 7,058,663 B2 | 6/2006 | Johnston et al. |
| 7,062,764 B2 | 6/2006 | Cohen et al. |
| 7,065,493 B1 | 6/2006 | Homsi |
| 7,080,083 B2 | 7/2006 | Kim et al. |
| 7,080,325 B2 * | 7/2006 | Treibach-Heck et al. .... 715/780 |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 * | 9/2006 | Silverbrook et al. ........ 382/119 |
| 7,107,282 B1 | 9/2006 | Yalamanchi |
| 7,107,521 B2 | 9/2006 | Santos |
| 7,120,863 B1 | 10/2006 | Wang |
| 7,124,167 B1 | 10/2006 | Bellotti et al. |
| 7,130,885 B2 | 10/2006 | Chandra et al. |
| 7,143,341 B1 | 11/2006 | Kohli |
| 7,146,564 B2 | 12/2006 | Kim et al. |
| 7,152,205 B2 | 12/2006 | Day et al. |
| 7,168,035 B1 | 1/2007 | Bell et al. |
| 7,190,376 B1 | 3/2007 | Tonisson |
| 7,191,394 B1 | 3/2007 | Ardeleanu et al. |
| 7,213,200 B2 | 5/2007 | Abe et al. |
| 7,236,982 B2 | 6/2007 | Zlatanov et al. |
| 7,272,789 B2 | 9/2007 | O'Brien |
| 7,281,018 B1 | 10/2007 | Begun et al. |
| 7,296,017 B2 | 11/2007 | Larcheveque et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,346,848 B1 | 3/2008 | Ruthfield et al. |
| 7,441,200 B2 | 10/2008 | Savage, Martin |
| 7,496,837 B1 | 2/2009 | Larcheveque et al. |
| 7,543,228 B2 | 6/2009 | Kelkar |
| 7,549,115 B2 | 6/2009 | Kotler |
| 2001/0007109 A1 * | 7/2001 | Lange ......................... 707/530 |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0051928 A1 | 12/2001 | Brody |
| 2001/0054004 A1 | 12/2001 | Powers |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk, Jr. et al. |
| 2002/0010855 A1 | 1/2002 | Reshef et al. |
| 2002/0013788 A1 * | 1/2002 | Pennell et al. ............... 707/507 |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 * | 3/2002 | Anand et al. .................... 705/7 |
| 2002/0032692 A1 | 3/2002 | Suzuki et al. |
| 2002/0032706 A1 * | 3/2002 | Perla et al. .................. 707/530 |
| 2002/0032768 A1 | 3/2002 | Voskuil |
| 2002/0035579 A1 | 3/2002 | Wang et al. |
| 2002/0035581 A1 | 3/2002 | Reynar et al. |

| | | |
|---|---|---|
| 2002/0040469 A1 | 4/2002 | Pramberger |
| 2002/0052769 A1 | 5/2002 | Navani et al. |
| 2002/0054126 A1 | 5/2002 | Gamon |
| 2002/0057297 A1 | 5/2002 | Grimes et al. |
| 2002/0065798 A1 | 5/2002 | Bostleman et al. |
| 2002/0070973 A1 | 6/2002 | Croley |
| 2002/0078074 A1 | 6/2002 | Cho et al. |
| 2002/0078103 A1* | 6/2002 | Gorman et al. ............ 707/530 |
| 2002/0100027 A1 | 7/2002 | Binding et al. |
| 2002/0107885 A1 | 8/2002 | Brooks et al. |
| 2002/0111932 A1 | 8/2002 | Roberge et al. |
| 2002/0112224 A1 | 8/2002 | Cox |
| 2002/0129056 A1* | 9/2002 | Conant et al. ............... 707/511 |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1* | 10/2002 | Rawat et al. ............... 709/203 |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178187 A1 | 11/2002 | Rasmussen et al. |
| 2002/0184188 A1 | 12/2002 | Mandyam et al. |
| 2002/0184219 A1 | 12/2002 | Preisig et al. |
| 2002/0184485 A1 | 12/2002 | Dray et al. |
| 2002/0188597 A1 | 12/2002 | Kern et al. |
| 2002/0188613 A1 | 12/2002 | Chakraborty et al. |
| 2002/0194219 A1* | 12/2002 | Bradley et al. ............... 707/506 |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1* | 1/2003 | Chen et al. ................... 345/741 |
| 2003/0023641 A1* | 1/2003 | Gorman et al. ............ 707/530 |
| 2003/0025732 A1 | 2/2003 | Prichard |
| 2003/0026507 A1 | 2/2003 | Zlotnick |
| 2003/0037303 A1 | 2/2003 | Bodlaender et al. |
| 2003/0038846 A1 | 2/2003 | Hori et al. |
| 2003/0043986 A1 | 3/2003 | Creamer et al. |
| 2003/0046665 A1 | 3/2003 | Ilin |
| 2003/0048301 A1* | 3/2003 | Menninger ................... 345/764 |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0061386 A1 | 3/2003 | Brown et al. |
| 2003/0061567 A1* | 3/2003 | Brown et al. ................. 715/507 |
| 2003/0084424 A1 | 5/2003 | Reddy et al. |
| 2003/0093755 A1 | 5/2003 | O'Carroll |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1* | 7/2003 | Aggarwal et al. ............ 715/505 |
| 2003/0128196 A1* | 7/2003 | Lapstun et al. ............... 345/180 |
| 2003/0135825 A1 | 7/2003 | Gertner et al. |
| 2003/0140132 A1 | 7/2003 | Champagne et al. |
| 2003/0142072 A1 | 7/2003 | Lapstun et al. |
| 2003/0149934 A1 | 8/2003 | Worden |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0182268 A1 | 9/2003 | Lal |
| 2003/0182327 A1 | 9/2003 | Ramanujam et al. |
| 2003/0187756 A1* | 10/2003 | Klivington et al. ............ 705/27 |
| 2003/0187930 A1 | 10/2003 | Ghaffar et al. |
| 2003/0188260 A1* | 10/2003 | Jensen et al. ................. 715/505 |
| 2003/0189593 A1 | 10/2003 | Yarvin |
| 2003/0192008 A1* | 10/2003 | Lee ............................ 715/506 |
| 2003/0200506 A1 | 10/2003 | Abe et al. |
| 2003/0204511 A1 | 10/2003 | Brundage et al. |
| 2003/0204814 A1 | 10/2003 | Elo et al. |
| 2003/0205615 A1 | 11/2003 | Marappan |
| 2003/0210428 A1 | 11/2003 | Bevlin et al. |
| 2003/0212664 A1 | 11/2003 | Breining et al. |
| 2003/0217053 A1 | 11/2003 | Bachman et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri et al. |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0237046 A1 | 12/2003 | Parker et al. |
| 2003/0237047 A1 | 12/2003 | Borson |
| 2004/0002939 A1 | 1/2004 | Arora et al. |
| 2004/0002950 A1 | 1/2004 | Brennan et al. |
| 2004/0003031 A1 | 1/2004 | Brown et al. |
| 2004/0003353 A1* | 1/2004 | Rivera et al. ................. 715/530 |
| 2004/0003389 A1 | 1/2004 | Reynar et al. |
| 2004/0010752 A1 | 1/2004 | Chan et al. |
| 2004/0024842 A1 | 2/2004 | Witt |
| 2004/0030991 A1* | 2/2004 | Hepworth et al. ............ 715/507 |
| 2004/0039881 A1 | 2/2004 | Shoebridge et al. |
| 2004/0039990 A1* | 2/2004 | Bakar et al. ................. 715/505 |
| 2004/0039993 A1 | 2/2004 | Kougiouris et al. |
| 2004/0044961 A1 | 3/2004 | Pesenson |
| 2004/0044965 A1* | 3/2004 | Toyama et al. ............... 715/523 |
| 2004/0054966 A1 | 3/2004 | Busch et al. |
| 2004/0059754 A1 | 3/2004 | Barghout et al. |
| 2004/0073565 A1 | 4/2004 | Kaufman et al. |
| 2004/0073868 A1* | 4/2004 | Easter et al. ................. 715/507 |
| 2004/0078756 A1* | 4/2004 | Napper et al. ............... 715/507 |
| 2004/0083426 A1* | 4/2004 | Sahu .......................... 715/505 |
| 2004/0088647 A1 | 5/2004 | Miller et al. |
| 2004/0088652 A1 | 5/2004 | Abe et al. |
| 2004/0093596 A1 | 5/2004 | Koyano |
| 2004/0107367 A1* | 6/2004 | Kisters ....................... 713/202 |
| 2004/0117769 A1 | 6/2004 | Lauzon et al. |
| 2004/0123277 A1 | 6/2004 | Schrader et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0172442 A1 | 9/2004 | Ripley |
| 2004/0186762 A1 | 9/2004 | Beaven et al. |
| 2004/0189716 A1* | 9/2004 | Paoli et al. ................... 345/853 |
| 2004/0194035 A1 | 9/2004 | Chakraborty |
| 2004/0205473 A1 | 10/2004 | Fisher et al. |
| 2004/0205525 A1* | 10/2004 | Murren et al. ............... 715/505 |
| 2004/0205534 A1* | 10/2004 | Koelle ........................ 715/507 |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0216084 A1 | 10/2004 | Brown et al. |
| 2004/0221238 A1* | 11/2004 | Cifra et al. ................... 715/762 |
| 2004/0221245 A1 | 11/2004 | Chickles et al. |
| 2004/0237030 A1* | 11/2004 | Malkin ....................... 715/505 |
| 2004/0260593 A1 | 12/2004 | Abraham-Fuchs et al. |
| 2004/0261019 A1 | 12/2004 | Imamura et al. |

| | | | | | | |
|---|---|---|---|---|---|---|
| 2004/0268229 | A1* | 12/2004 | Paoli et al. ............... 715/508 | 2007/0094589 A1 | 4/2007 | Paoli |
| 2005/0004893 | A1 | 1/2005 | Sangroniz | 2007/0100877 A1 | 5/2007 | Paoli |
| 2005/0005248 | A1 | 1/2005 | Rockey et al. | 2007/0101280 A1 | 5/2007 | Paoli |
| 2005/0015279 | A1 | 1/2005 | Rucker | 2007/0118803 A1 | 5/2007 | Walker et al. |
| 2005/0015732 | A1 | 1/2005 | Vedula et al. | 2007/0130500 A1 | 6/2007 | Rivers-Moore et al. |
| 2005/0022115 | A1 | 1/2005 | Baumgartner et al. | 2007/0130504 A1 | 6/2007 | Betancourt et al. |
| 2005/0027757 | A1 | 2/2005 | Kiessig et al. | 2007/0208606 A1 | 9/2007 | MacKay et al. |
| 2005/0028073 | A1 | 2/2005 | Henry et al. | 2007/0208769 A1 | 9/2007 | Boehm et al. |
| 2005/0033728 | A1 | 2/2005 | James | 2007/0276768 A1 | 11/2007 | Pallante |
| 2005/0038711 | A1 | 2/2005 | Marlelo | 2008/0126402 A1 | 5/2008 | Sitchi et al. |
| 2005/0050066 | A1 | 3/2005 | Hughes | | | |
| 2005/0055627 | A1* | 3/2005 | Lloyd et al. ............... 715/505 | | | |
| 2005/0060324 | A1 | 3/2005 | Johnson et al. | | | |
| 2005/0060721 | A1 | 3/2005 | Choudhary et al. | | | |
| 2005/0065933 | A1* | 3/2005 | Goering ................ 707/9 | | | |
| 2005/0065936 | A1* | 3/2005 | Goering ............... 707/100 | | | |
| 2005/0066287 | A1 | 3/2005 | Tattrie et al. | | | |
| 2005/0071752 | A1* | 3/2005 | Marlatt ............... 715/506 | | | |
| 2005/0076049 | A1 | 4/2005 | Qubti et al. | | | |
| 2005/0091285 | A1 | 4/2005 | Krishnan et al. | | | |
| 2005/0091305 | A1 | 4/2005 | Lange et al. | | | |
| 2005/0097536 | A1 | 5/2005 | Bernstein et al. | | | |
| 2005/0102370 | A1 | 5/2005 | Lin et al. | | | |
| 2005/0102612 | A1 | 5/2005 | Allan et al. | | | |
| 2005/0108104 | A1* | 5/2005 | Woo ............... 705/26 | | | |
| 2005/0108624 | A1* | 5/2005 | Carrier ............... 715/505 | | | |
| 2005/0114757 | A1 | 5/2005 | Sahota et al. | | | |
| 2005/0114764 | A1 | 5/2005 | Gudenkauf et al. | | | |
| 2005/0132043 | A1 | 6/2005 | Wang et al. | | | |
| 2005/0132196 | A1 | 6/2005 | Dietl | | | |
| 2005/0138031 | A1 | 6/2005 | Wefers | | | |
| 2005/0138086 | A1 | 6/2005 | Pecht-Seibert | | | |
| 2005/0149375 | A1 | 7/2005 | Wefers | | | |
| 2005/0149726 | A1 | 7/2005 | Joshi et al. | | | |
| 2005/0160398 | A1 | 7/2005 | Bjornson et al. | | | |
| 2005/0171746 | A1 | 8/2005 | Thalhammer-Reyero | | | |
| 2005/0198086 | A1 | 9/2005 | Moore et al. | | | |
| 2005/0198125 | A1 | 9/2005 | Beck et al. | | | |
| 2005/0198247 | A1 | 9/2005 | Perry et al. | | | |
| 2005/0210263 | A1* | 9/2005 | Levas et al. ............... 713/182 | | | |
| 2005/0223063 | A1* | 10/2005 | Chang et al. ............... 709/206 | | | |
| 2005/0223320 | A1 | 10/2005 | Brintzenhofe et al. | | | |
| 2005/0246304 | A1 | 11/2005 | Knight et al. | | | |
| 2005/0262112 | A1 | 11/2005 | Moore | | | |
| 2005/0268217 | A1 | 12/2005 | Garrison | | | |
| 2005/0268222 | A1* | 12/2005 | Cheng ............... 715/513 | | | |
| 2006/0010386 | A1 | 1/2006 | Khan | | | |
| 2006/0020586 | A1 | 1/2006 | Prompt et al. | | | |
| 2006/0026534 | A1 | 2/2006 | Ruthfield et al. | | | |
| 2006/0031757 | A9* | 2/2006 | Vincent, III ............... 715/513 | | | |
| 2006/0036995 | A1 | 2/2006 | Chickles et al. | | | |
| 2006/0041838 | A1 | 2/2006 | Khan | | | |
| 2006/0059107 | A1 | 3/2006 | Elmore et al. | | | |
| 2006/0059434 | A1* | 3/2006 | Boss et al. ............... 715/780 | | | |
| 2006/0069605 | A1 | 3/2006 | Hatoun | | | |
| 2006/0069985 | A1 | 3/2006 | Friedman et al. | | | |
| 2006/0080657 | A1 | 4/2006 | Goodman | | | |
| 2006/0085409 | A1 | 4/2006 | Rys et al. | | | |
| 2006/0101037 | A1 | 5/2006 | Brill et al. | | | |
| 2006/0101051 | A1 | 5/2006 | Carr et al. | | | |
| 2006/0107206 | A1 | 5/2006 | Koskimies | | | |
| 2006/0129978 | A1 | 6/2006 | Abriani et al. | | | |
| 2006/0143220 | A1 | 6/2006 | Spencer | | | |
| 2006/0161559 | A1 | 7/2006 | Bordawekar et al. | | | |
| 2006/0161837 | A1 | 7/2006 | Kelkar et al. | | | |
| 2006/0173865 | A1 | 8/2006 | Fong | | | |
| 2007/0005611 | A1 | 1/2007 | Takasugi et al. | | | |
| 2007/0036433 | A1 | 2/2007 | Teutsch | | | |
| 2007/0050719 | A1 | 3/2007 | Lui et al. | | | |
| 2007/0061467 | A1 | 3/2007 | Essey | | | |
| 2007/0061706 | A1 | 3/2007 | Cupala | | | |
| 2007/0074106 | A1 | 3/2007 | Ardeleanu | | | |
| 2007/0088554 | A1 | 4/2007 | Harb et al. | | | |

FOREIGN PATENT DOCUMENTS

| | | |
|---|---|---|
| EP | 0961197 | 12/1999 |
| EP | 1076290 | 2/2001 |
| JP | 63085960 | 4/1988 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 10-2207805 | 8/1998 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 8/2001 |

OTHER PUBLICATIONS

Altova, Inc., "XML Spy 4.0 Manual," Altova Inc. & Altova GmbH, copyright 1998-2001, Chapters 1, 2, and 6, encompassing pp. 1-17, 18-90, and 343-362.

Cybook, Inc.: "Copying the Search Form to Services-based Web Sites" INternet Article, (online) Jul. 26, 2004.*the whole document.

Excel Developer Tip (hereinafter."Excel"), "Determining the Data Type of a Cell", May 13, 1998, p. 1 (available at http://jwalk.com/ss//excel/tips/tip62.htm).

Macromedia, Inc.: "Dreamweaver Technote, Changes in copying and pasting in Dreamweaver 4" Internet Article (online). *the whole document*

Rado, Dave: "How to create a template that makes it easy for users to "fill in the blanks", without doing any programming" Microsoft Word MVP FAQ Site, (online) Apr. 30, 2004, the whole document.

Cover, XML Forms Architecture, retrieved at <<http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

"Architecture for a Dynamic Information Area Control" IBM Technical Disclosure Bulletin IBM Corp. New York US vol. 37 No. 10 Jan. 10, 1994. pp. 245-246.

Alschuler Liora "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.

Au Irene et al. "Netscape Communicator's Collapsible Toolbars" CHI'98 Human Factors in Computing Systems Conference Proceedings Los Angeles CA Apr. 18-23, 1998 pp. 81-86.

Battle Steven A. et al.; "Flexible Information Presentation with XML" 1998 The Institution of Electrical Engineers 6 pages.

Brogden William; "Arbortext Adept 8 Editor Review" O'Reilly XMLCOM 'Online! Sep. 22, 1999 XP002230080 retrieved from the Internet <URL:http://www.xml.com/pub/a/1999/09/adept/AdeptRvw.htm> retrieved on Feb. 5, 2003.

Chen Yi et al.: A; "XKvalidator: A Constraint Validator for XML" CIKM '-2 Nov. 4-9, 2002 Copyright 2002 ACM 1-58113-492-4/02/0011 pp. 446-452.

Ciancarini Paolo et al.; "Managing Complex Documents Over the WWW: A Case Study for XML" IEEE Transactions on Knowledge and Data Engineering vol. 11 No. 4 Jul./Aug. 1999. pp. 629-938.

Davidow Ari: Alle; "XML Editors: Allegations of Functionality in search of reality" Internet 'Online! 1999 XP002230082 retrieved from the Internet <URL:http://www.ivritype.com/xml/>.

Kanemoto Hirotaka et al; "An Efficiently Updatable Index Scheme for Structured Documents" 1998 IEEE pp. 991-996.

Sutanthavibul Supoj et al.; "XFIG Version 3.2 Patchlevel 2 (Jul. 2, 1998) Users Manual (Edition 1:0)" Internet Document [Online] Jul. 2, 1998 XP002229137 Retrieved from the Internet: <URL:http://www.ice.mtu.edu/online_docs/xfig332/> [retrieved on Jan. 28, 2003].

Usdin Tommie et al.; Not a; "XML: Not a Silver Bullet But a Great Pipe Wrench" Standardview vol. 6 No. 3 Sep. 1998 pp. 125-132.

Chien Shu-Yao et al.; "Efficient Management of Multiversion Documents by Object Referencing" Proceedings of the 27th VLDB Conference 2001 pp. 291-300.

Chien Shu-Yao et al.; "Efficient schemes for managing mulitversion XML documents" VLDB Journal (2002) pp. 332-352.

Chien Shu-Yao et al.; "Storing and Querying Multiversion XML Documents using Durable Node Numbers" IEEE 2002 pp. 232-241.

Chien Shu-Yao et al.; "XML Document Versioning" SIGMOD Record vol. 30 No. 3 Sep. 2001 pp. 46-53.

Dyck Timothy; "XML Spy Tops as XML Editor" http://www.eweek.com/article2/0395972404100.asp Nov. 25, 2002 4 pages.

Haukeland Jan-Henrick; "Tsbiff—tildeslash biff—version 1.2.1" Internet Document [Online] Jun. 1999 URL: http://web.archive.org/web/19990912001527/http://www.tildeslash.com/tsbiff/.

Nelson Mark; "Validation with MSXML and XML Schema" Windows Developer Magazine Jan. 2002 pp. 35-38.

Netscape Communication Corpora; "Netscape Communicator 4.61 for OS/2 Warp" Software 1999 The whole software release & "Netscape—Version 4.6 [en]-010615" Netscape Screenhot Oct. 2, 2002.

Noore A.; "A secure conditional access system using digital signature and encryption" 2003 Digest of Technical Papers. International Conference on Consumer Electronics Jun. 2003 pp. 220-221.

Rogge et al.; "Validating MPEG-21 Encapsulated Functional Metadata" IEEE 2002 pp. 209-212.

Wong Raymond K. et al.; "Managing and Querying Multi-Version XML Data with Update Logging" DocEng '02 Nov. 8-9, 2002 Copyright 2002 ACM 1-58113-594-7/02/0011 pp. 74-81.

Cheng Ya Bing et al.; "Designing Valid XML Views" ER 2002 LNCS 2503 2002 Springer-Verlag Berlin Heidelberg 2002 pp. 463-477.

Chuang Tyng-Ruey; "Generic Validation of Structural Content with Parametric Modules" ICFP '01 Sep. 3-5, 2001 Copyright 2001 ACM 1-58113-415-0/01/0009 pp. 98-109.

Dayton Linnea and Jack Davis; "Photo Shop 5/5.5 WOW! Book" 2000 Peachpit Press pp. 8-17.

Hall Richard Scott; "Agent-based Software Configuration and Deployment" Thesis of the University of Colorado Online Dec. 31, 1999 retrieved from the Internet on Nov. 7, 2003: <http://www.cs.colorado.edu/users/rickhall/documents/ThesisFinal.pdf> 169 pages.

Hardy Mathew R. B. et al; "Mapping and Displaying Structural Transformations between XML and PDF" DocEng '02 Nov. 8-9, 2002 Copyright 2002 ACM 1-58113-597-7/02/0011 pp. 95-102.

Kim Sang-Kyun et al.; "Immediate and Partial Validation Mechanism for the Conflict Resolution of Update Operations in XML Databases" WAIM 2002 LNCS 2419 2002 pp. 387-396 Springer-Veriag Berlin Heidelberg 2002.

Netscape Communication Corp; "SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

Tomimori et al.; "An Efficient and Flexible Access Control Framework for Java Programs in Mobile Terminals"; 22nd International Conference on Distributed Computing Systems Workshops; 2002; pp. 777-782.

Van Hoff Arthur et al.; "The Open Software Description Format" Online Aug. 13, 1997 retrieved from the Internet on Nov. 17, 2003: <http://www.w3.org/TR/NOTE-OSD> 11 pages.

Verlamis Iraklis et al.; "Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

Williams Sara and Charlie Kin; "The Component Object Model" A Technical Overview Oct. 1994 Microsoft Corp. pp. 1-14.

Pacheco et al., "Delphi 5 Developer's Guide," Sams Publishing, 1999, Chapter 31 Section: Data Streaming, 6 pages.

"Netscape window," Netscape Screenshot Oct. 2, 2002.

Clarke P., "From small beginnings" Knowledge Management Nov. 2001, pp. 28-30.

Hwang et al., "Micro-Firewalls for Dynamic Network Security with Distributed Intrusion Detection"; IEEE International Symposium on Network Computing and Applications; 2001; pp. 68-79.

Kaiya et al., "Specifying Runtime Environments and Functionalities of Downloadable Components Under the Sandbox Mode"; International Symposium on Principles of Software Evolution; 2000; pp. 138-142.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

Sun Q. et al., "A robust and secure media signature scheme for JPEG images" Proceedings of 2002 IEEE Workshop on Multimedia Signal Processing, Dec. 2002, pp. 296-299.

Prevelakis et al., "Sandboxing Applications"; Proceedings of the FREENIX Track; 2001; pp. 119-126.

Schmid et al., "Protection Data from Malicious Software"; 18th Annual Computer Security Applications Conference; 2002; pp. 199-208.

Trupin J., "The Visual Programmer," Microsoft Systems Journal, Apr. 1996, pp. 103-105.

Zdonik S., "Object Management System Concepts," ACM, 1984, pp. 13-19.

"Store and Organize Related Project Files in a Binder," Getting Results with Microsoft Office, 1990, pp. 109-112.

Barker et al., "Creating In-Line Objects Within An Integrated Editing Environment," IBM Technical Disclosure Bulletin, vol. 27, No. 5, Oct. 1984, p. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascla et al., "Sweeper" Microsoft Interactive Developer, vol. 1, No. 1, 1996, 27 pages.

Herzner et al., "CDAM- Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Clark James—W3C Editor; "XSL Transformation (XSLT) Verison 1.0" Nov. 16, 1999 W3C (MIT INRIA Kejo) pp. 1-156.

Description of Whitehill Composer software project producted by Whitehill Technologies Inc. available at <http://www.xml.com/pub/p/221> accessed on Apr. 8, 2004, two pages.

McCright J.S.; "New Tool Kit to Link Groove with Microsoft Sharepoint" eWeek Enterprise News & Reviews Ziff Davis Media INc. Jul. 29, 2002 1 page.

Musgrave S; "Networking technology—impact and opportunites" Survey and Statistical Computing 1996. Proceedings of the Second ASC International Conference. Sep. 1996. pp. 369-378. London UK.

Rapaport L; "Get more from SharePoint" Transform Magazine vol. 11 No. 3. Mar. 2002 pp. 1315.
W3C Editor James Clark and Ste; "XML Path Language (XPath) Version 1.0" Nov. 16, 1999W3C (MIT INRIA Kejo) pp. 1-49.
OMG XML Metadata Interchange (XMI) Specification Version 1.2 Jan. 2002.
Laura Acklen and Read Gilgen, "Using Corel Wordperfect 9", 251-284, 424-434, 583-586 (1998).
Atova, "User Reference manual Version 4.4, XML Spy suite 4.4," Atova Ges.m.b.H and Altova, Inc., May 24, 2002, pages cover, copyright page, 1-565.
Altova et al. XML Spy, XML integrated Development Environments, Altova Inc., 2002, pp. 1-18.
Ben-Natan, U.S. Appl. No. 60/203,081, filed May 9, 2000, entitled "Internet platform for creating and supporting communities".
Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.
Han et al., WebSplitter: A Unified XML Framework for Multi-Device Collaborative Web Browsing, 2000, ACM Conference on Cimputer Supported Cooperative Work, 10 pages.
IBM: Stack Algorithm for Extractin Subtree from Serialized Tree, Mar. 1, 1994, TDB-ACC-NONN94033, 3 pages.
Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
Kutay, U.S. Appl. No. 60/209,713, filed Jun. 5, 2000, entitled, "Methods and systems for accessing, organizing presenting and viewing data".
LeBlond et al, "PC Magazine Guide to Quattro Pro for Windows", pp. 9-11, 42-61, Ziff-Davis Press, Copyright 1993 by the LeBlond Group.
Mansfield, "Excel 97 for Busy People", Published by Osborne/Mcgraw-Hill 1997 pp. 48-50.
"Microsoft Visual Basic 5.0 Programmer's Guide 1997"; pp. 578-579; Redmond WA 98052-6399.
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
"Enter Key", Retrieved from the Internet at http://systems.webopedia.com/TERM/Enter_key.html on Dec. 20, 2006.
"Microsoft Visual Basic 5.0 Programmer's Guide", *Microsoft Press*, (1997),pp. 42-43, 54-58.
"Microsoft Word 2000", Screenshots,(1999),1-5.
Beauchemin, Dave , "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Borland, Russo , "Running Microsoft Word 97", 314-315, 338, 361-362, 390, and 714-719.
Brabrand, et al., "Power Forms Declarative Client-side Form Field Validation", (2002),1-20.
Dubinko, Micah , "XForms and Microsoft InfoPath", Retrieved from the Internet at http://www.xml.com/lpt/a/1311 on Jan. 21, 2007,(Oct. 29, 2003).
Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Lehtonen, Miro , et al., "A Dynamic User Interface for Document Assembly", Department of Computer Science, University of Helsinki,(Nov. 2002).
Nelson, Joe , "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.
Rees, Michael J., "Evolving the Browser Towards a Standard User Interface Architecture", School of Information Technology, Bond University, Australia,(2001).
Singh, Darshan , "Microsoft InfoPath 2003 By Example", Retrieved from the Internet at http://www.perfectxml.com/InfoPath.asp on Jan. 21, 2007,(Apr. 20, 2003).
Udell, Jon , "InfoPath and XForms", Retrieved from the Internet at http://weblog.infoworld.com/udell/2003/02/26.html,(Feb. 26, 2003).
Anat, Eyal et al., "Integrating and Customizing Hererogeneous E-Commerce Applications", The VLDB Journal-The International Journal on Very Large Data Bases, vol. 10, Issue 1,(Aug. 2001),16-38.
Adams, Susie et al., "BizTalk Unleashed", Sams publishing, 2002, first printing Mar. 2001, 1-2, 31-138.
Vasters, Clemens F., "BizTalk Server 2000 A Beginner's Guide", Osborne/McGraw-Hill,(2001),1-2, 359-402.
Halberg, Bruce et al., "Using Microsoft Excel 97", (1997), 191-201, 213-219.
Villard, et al., "An Incremental XSLT Transformation Processor for XML Document Manipulation", http://www2002.org/CDROM/refereed/321, Printed on May 18, 2007,(May 2002),25 pages.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).
"Microsoft Word 2000 Screenshots", (2000),11-17.
Pacheco, Xavier et al., "Delphi 5 Developer's Guide", Sams Publishing. Chapter 31, Section: Data Streaming,(1999),4.
XmlSpy, "XmlSpy 2004 Enterprise Edition Manual", Altova,(May 17, 2004),1-25, 220-225.
StylusStudio, "StylusStudio: XPath Tools", 2004-2007, StylusStudio, 1-14.
Dodds, "Toward an XPath API", xml.com,(May 7, 2001),1-3.
Altova, "Altova Tools for XPath 1.0/2.0", Altova,1-12.
"Microsoft Word 2000 Screenshots", Word,(2000),1-17.
Bradley, Neil "The XML Companion, Third Edition", *Published by Addison Wesley Professional*, http://proquest.safaribooksonline.com0201770598, http,(Dec. 12, 2001),1-18.
Klarlund, Nils "DSD: A Schema Language for XML", *ACM, FSMP* Portland Oregon, (2000),101-111.
Watt, Andrew "MIcrosoft Office Infopath 2003 Kick Start", (*Published by Sams*) Pint ISBN-10:0-672-32623-X, (Mar. 24, 2004),1-57.
Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.
Kay, Michael "XSL Transfornmations (XSLT) Version 2.0", http://www.w3.org/TR/2005/WD-xslt20-20050404, (Apr. 2005),1-374.
"Non-Final OA", U.S. Appl. No. 10/939,588, (Feb. 18, 2009),40 pages.
"Notice of Allowance", U.S. Appl. No. 10/404,312, (Jan. 12, 2009),12 pages.
"Final Office Action", U.S. Appl. No. 10/857,689, (Jan. 6, 2009),23 pages.
"Non Final Office Action", U.S. Appl. No. 10/977,198, (Feb. 2, 2009), 15 pages.
"Non Final Office Action", U.S. Appl. No. 10/939,588, (Feb. 18, 2009),40 pages.
"Non Final Office Action", U.S. Appl. No. 10/976,451, (Feb. 23, 2009),39 pages.
"Non final Office Action", U.S. Appl. No. 11/234,767, (Feb. 26, 2009),37 pages.
"Notice of Allowance", U.S. Appl. No. 11/167,514, (Mar. 11, 2009),6 pages.
"Non Final Office Action", U.S. Appl. No. 10/942,528, (Mar. 6, 2009),31 pages.
"Non Final Offfice Action", U.S. Appl. No. 11/170,521 , (Jan. 21, 2009),86 pages.

"Foreign Office Action", Application Serial No. 2,412,611, (Feb. 9, 2009),6 pages.

"Foreign Office Action", Application Serial No. 200610003709.2, (Jan. 9, 2009),8 pages.

"EP Office Action", Application Serial No. 06111546.5, (Oct. 15, 2008),5 pages.

"Notice of Re-Examination", Application Serial No. 01813138.7, (Mar. 11, 2009),27 pages.

"Final Office Action", U.S. Appl. No. 11/107,347, (Apr. 2, 2009),15 pages.

"Restriction Requirement", U.S. Appl. No. 11/227,550, (Apr. 2, 2009),8 pages.

"Non Final Office Action", U.S. Appl. No. 10/955,665, (Apr. 2, 2009),19 pages.

"Non Final Office Action", U.S. Appl. No. 10/988,720, 19 pages.

"Final Office Action", U.S. Appl. No. 11/203,818, (Apr. 14, 2009),31 pages.

"Final Office Action", U.S. Appl. No. 11/044,106, (Apr. 13, 2009),20 pages.

"Final Office Action", U.S. Appl. No. 11/226,044, (Apr. 20, 2009),24 pages.

"Final Office Action", U.S. Appl. No. 11/056,500, (Apr. 16, 2009),10 pages.

"Foreign Office Action", Application Serial No. 200610003709.2, (Jan. 09, 2009),8.

"EP Office Action", Application Serial No. 06111546.5, (Oct. 15, 2008),5 pages.

"Final Office Action", U.S. Appl. No. 11/107,347, (Apr. 2, 2009),15 pages.

"Final Office Action", U.S. Appl. No. 11/203,818, (Apr. 14, 2009),31 pages.

"Final Office Action", U.S. Appl. No. 11/044,106, (Apr. 13, 2009),20 pages.

"Final Office Action", U.S. Appl. No. 11/226,044, (Apr. 20, 2009),24 pages.

"Final Office Action", U.S. Appl. No. 11/056,500, (Apr. 16, 2009),10 pages.

"Final Office Action", U.S. Appl. No. 11/203,937, (May 7, 2009),13 pages.

"Non Final Office Action", U.S. Appl. No. 10/955,666, (May 7, 2009),28 pages.

"Non Final Office Action", U.S. Appl. No. 10/876,433, (Apr. 24, 2009),62 pages.

"Non Final Office Action", U.S. Appl. No. 10/916,692, (Apr. 30, 2009),14 pages.

"Non Final Office Action", U.S. Appl. No. 09/599,809, (May 13, 2009),25 pages.

"Non Final Office Action", U.S. Appl. No. 11/295,178, (May 27, 2009),111.

"Non Final Office Action", U.S. Appl. No. 10/990,152, (May 28, 2009),19.

"Final Office Action", U.S. Appl. No. 11/036,910, (Jun. 1, 2009),15 pages.

"Non Final Office Action", U.S. Appl. No. 10/857,689, (Jun. 11, 2009),25 pages.

"Non Final Office Action", U.S. Appl. No. 11/095254, (Jun. 8, 2009),21 pages.

"Final Office Action", U.S. Appl. No. 11/234,767, (Jun. 10, 2009),24 pages.

"Foreign Office Action", Application Serial No. 2002-503702, Final Notice of Rejection (Jun. 05, 2009)212 pages.

Kaori, Iwantani et al., "Perfect Manual of Clarisworks 4.0 for Macintosh", 1st Edition, Japan,(07/297),pp. 153-167.

Noriko, Matsushita "Step-up Training of Clarisworks (tabulation), Successful Use of Spreadsheet and Tabulation", Mac People, vol. 4, No. 19,(Oct. 1, 1998),pp. 138-139.

Akihiro, Senda "Word 2000, Conservative- Looking but 'Attentive' New Function", NIKKEI PC 21, vol. 4, No. 8,(Aug. 1, 1999),pp. 115-116.

Yasuji, Fukuhara "Clarisworks, Introduction to Business Document Construction, No. 4, Estimate", NIKKEI MAC, No. 14,(May 17, 1994),pp. 197-204.

* cited by examiner

Absence Request

Request Date: 8/25/2004.  Request Time: 10:40 AM

Employee

202 — Name: Ned

ID Number:

Department:

Telephone Number:

204 — E-mail Address: Ned@contoso.com

Manager

Name:

Telephone Number:

E-mail Address:

Absence Details

| Start Date | End Date | Type | Hours |
|---|---|---|---|
| | | Paid vacation | 0.00 |
| | | Total hours requested | 0:00 |

ROLE-DEPENDENT ACTION FOR AN ELECTRONIC FORM

CROSS REFERENCE TO RELATED PATENT APPLICATION

This is related to a co-pending U.S. patent application having Ser. No. 10/988,732, and a filing date of Nov. 15, 2004 for BUILDING A DYNAMIC ACTION FOR AN ELECTRONIC FORM of Friend et al. This co-pending United States Patent Application is commonly assigned herewith and is hereby incorporated herein by reference for all that it discloses.

TECHNICAL FIELD

This invention relates to actions for electronic forms.

BACKGROUND

Electronic data-entry forms are commonly used to collect information. These electronic forms enable users to enter data and have that data stored digitally, such as in computer-accessible databases. Data so stored can be quickly retrieved, allowing others to use that data.

To make electronic data-entry forms more efficient and user-friendly, the forms can be built to include actions. These actions may reduce how much data a data-entry user has to enter,-such as by auto-populating data-entry fields, and make data entry generally easier and less error prone.

For example, assume that an electronic data-entry form requires entry of a mailing address. To enable a user to enter this address, the form provides data-entry fields for entry of a street address, a city, a state, and a ZIP code. To enter the mailing address, the user can enter the street address, the city, the state, and the ZIP code. But a form can be more efficient and user friendly by having an action that auto-populates the city and state based on an entered ZIP code. This action enables a user to have a full address entered into the form without having to enter the city and state.

Building this and other actions into an electronic data-entry form, however, can require significant time and computer-programming skill. A person often needs to have extensive training and experience in computer programming before he or she can build actions into an electronic data-entry form. Even with extensive training, this programmer may need hours or even days to build and maintain actions for an electronic data-entry form.

Further, actions built for electronic data-entry forms may have limited functionality and so not permit many desirable functions.

SUMMARY

Systems and/or methods ("tools") that enable creation and/or use of an action for an electronic data-entry form dependent on a role of a user are described.

BRIEF DESCRIPTION OF THE DRAWINGS

FIG. 2 illustrates an exemplary editable view of an electronic data-entry form.

FIG. 10 illustrates an exemplary runtime view of an electronic data-entry form.

The same numbers are used throughout the disclosure and figures to reference like components and features.

DETAILED DESCRIPTION

Overview

The following disclosure describes a user-friendly way to build dynamic actions for electronic data-entry forms. A person designing a form, for instance, is able to build a dynamic action into an electronic data-entry form without having to understand a computer language, have computer-program training, or write script or code.

In one embodiment, a designer is able to build a dynamic action for an electronic data-entry form through a graphical user interface. This dynamic action can comprise declarative business logic capable of targeting arbitrary data structures in response to user-driven events. These arbitrary data structures can comprise data-entry fields of an electronic data-entry form; and the user-driven events can comprise triggering events of the electronic data-entry form, such as a user loading the form or changing data in the form.

In another embodiment, a designer is able to build a dynamic action having a condition. This condition may be used to make an action dependent on a state of an electronic data-entry form, data from secondary sources, or a role of a current user of the form. When dependent on a current user's role, an action may be tailored to fit that user's role.

Exemplary Operating Environment

Before describing the tools for building actions in detail, the following discussion of an exemplary operating environment is provided to assist the reader in understanding where and how the tools may be employed. It is to be understood that the description provided below constitutes but one example and is not intended to limit application of the tools to any one particular operating environment.

Figure 1:
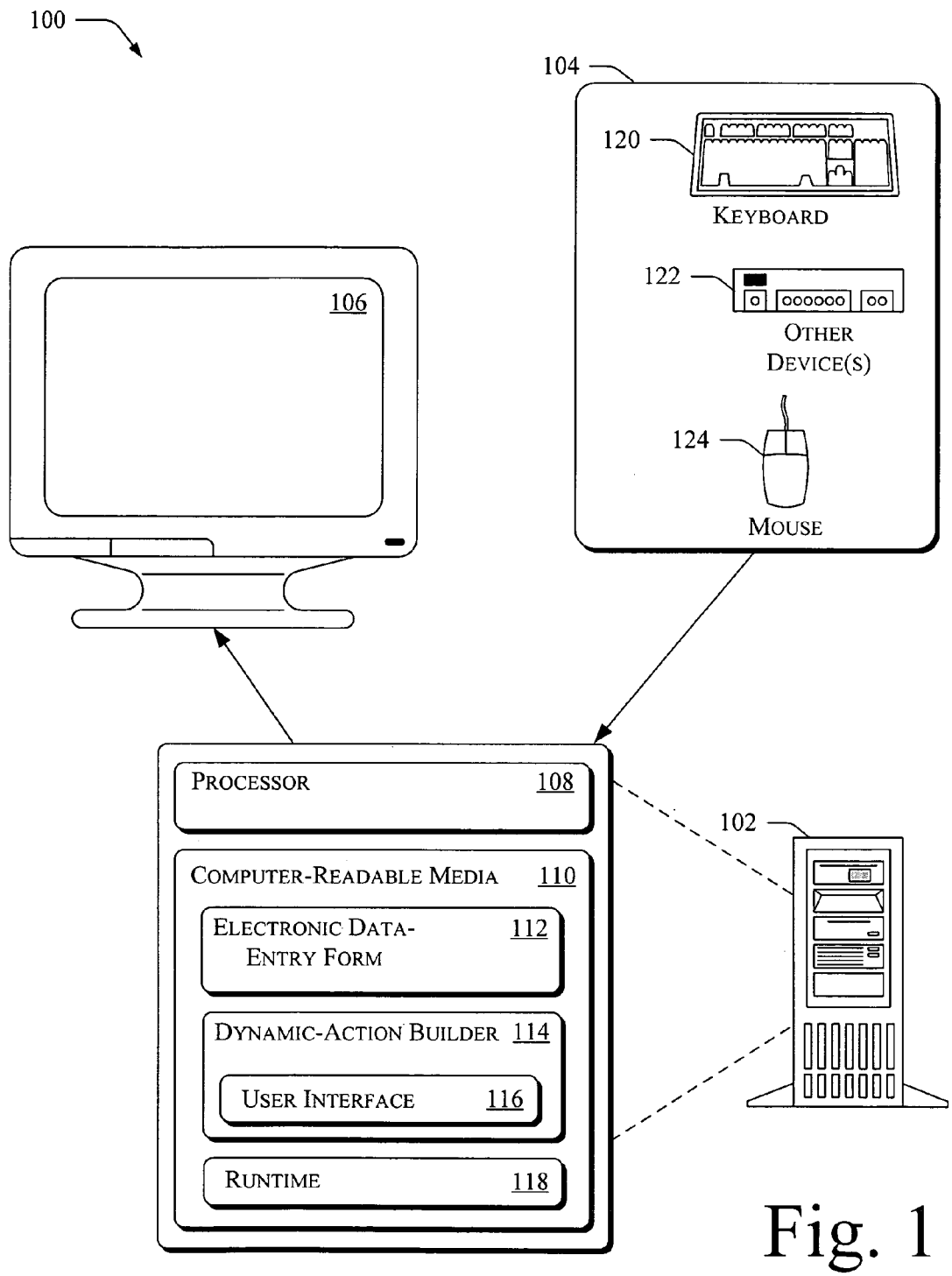
FIG. 1 illustrates an exemplary operating environment.

FIG. 1 illustrates one such operating environment generally at 100 comprising a computer 102, user-input devices 104, and a display 106. The computer is shown comprising a processor 108 and computer-readable media 110. The processor is capable of accessing and/or executing the computer-readable media. The computer-readable media comprises an electronic data-entry form 112, a dynamic-action builder application 114 having a user interface 116, and a runtime application 118.

The dynamic-action builder is capable of enabling a designer to build an action for the electronic data-entry form. The user interface is capable of presenting and receiving information to and from the designer, such as through the display and the user-input devices. The user-input devices may comprise any device allowing a computer to receive the designer's preferences, such as a keyboard 120, other device(s) 122, and a mouse 124. The other input devices may comprise, for example, a touch screen, a voice-activated input device, and a track ball.

The runtime application is capable of executing a dynamic action for an electronic data-entry form and enabling a user to interact with the electronic data-entry form.

Dynamic Actions

The following discussion describes dynamic actions, after which ways in which the tools enable a designer to build dynamic actions are described.

In accordance with one embodiment, a dynamic action can have two or more parts. One part is the action itself. Actions can provide automated functionality for an electronic data-entry form, such as auto-populating data into a data-entry field, enabling selection of a particular field or selector, and presenting a dialog.

Another part of a dynamic action is a triggering event. Triggering events are associated with or generated by an electronic data-entry form and may be caused by a user's interaction with the electronic data-entry form.

Triggering events may be associated generally with an electronic data-entry form or specifically with a particular part of an electronic data-entry form. Opening an electronic data-entry form or submitting an entire electronic data-entry form, for instance, can comprise a triggering event associated generally with the form. Changing data in a data-entry field or selecting some part (e.g., a button) of an electronic data-entry form, for instance, can comprise a triggering event associated with a particular part of the form.

A dynamic action may also comprise a condition. A condition contains information about the state of the form, secondary data, or a user of the form, such as whether or not data in one data-entry field is larger than data in another data-entry field, whether or not data from a web server is of a particular type, or whether or not the user of the form has certain rights.

Building Dynamic Actions

The following discussion describes ways in which the tools enable a designer to build a dynamic action for an electronic data-entry form.

To facilitate building a dynamic action, the tools may enable a designer to graphically select a triggering event. The tools can do so through a graphical user interface presenting, for example, the following triggering events: a data change trigger, caused by a user modifying data in the electronic data-entry form; a click trigger, caused by a user clicking on a selector (e.g., a button); a load trigger, caused when a user opens the form; and a submit trigger, caused with the user submits the form.

For triggering events associated with a particular part (e.g., a data structure) of the electronic data-entry form, selection of the particular part may be enabled through graphical presentation of various views of the electronic data-entry form, such as views having areas in which selectable data-entry fields or nodes are presented.

Figure 2:
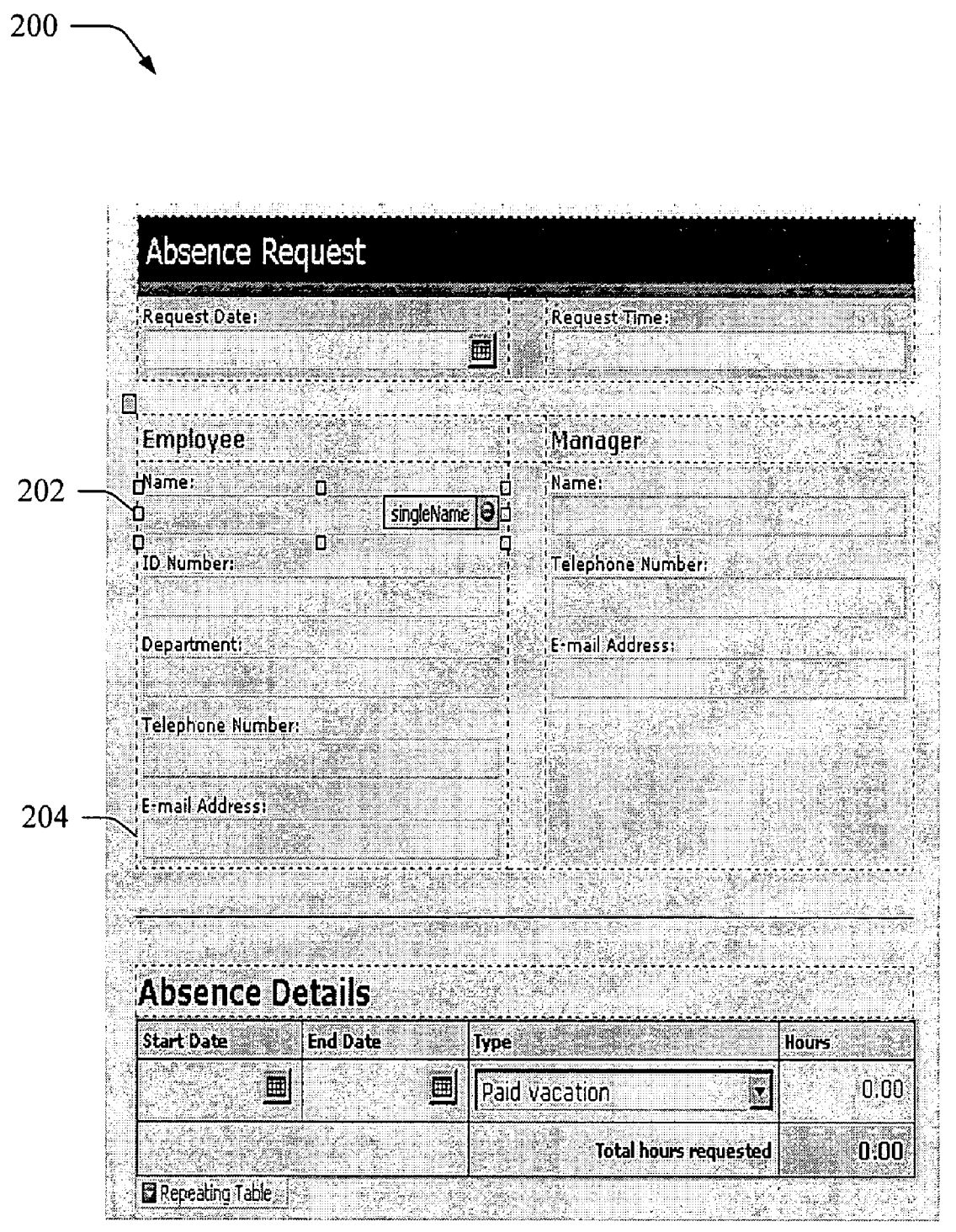

In the illustrated embodiment starting with FIG. 2, dynamic-action builder 114 enables graphical selection of a triggering event through presentation of an exemplary electronic data-entry form area having an editable view 200 of the electronic data-entry form 112. The dynamic-action builder can do so through user interface 116 and with point-and-click selection via mouse 124, for instance. This view is shown with a name data-entry field 202 having been selected. The dynamic-action builder may assume, because the selected name field is capable of enabling a user to change data in the electronic data-entry form, that the triggering event desired is the data change trigger.

Also as part of the enabled graphical selection, the designer is able to graphically select an arbitrary data structure for the triggering event. Here the designer selects the name field, which has a corresponding node in the form's data structure. In this embodiment, the form is represented in a hierarchically structured electronic document written in part using a markup language, such as eXtensible Markup Language (XML).

When a designer selects a particular data-entry field, rather than the entire electronic data-entry form, the dynamic-action builder makes the dynamic action dependent on a triggering event caused by a user's action related to the selected field. In this case, the dynamic-action builder builds the dynamic action such that it is triggered when a user of the electronic data-entry form changes (adds, deletes, or modifies) data in the name field.

In the illustrated embodiment, a portion of the dynamic action is logically structured as a "rule" associated with the dynamic action's triggering event. This rule executes when triggered by the dynamic action's triggering event and may comprise a condition and one or more actions. The condition, if one is present, is evaluated to determine whether or not to perform the action or actions. If no condition is present, the action(s) can be performed.

Figure 3:
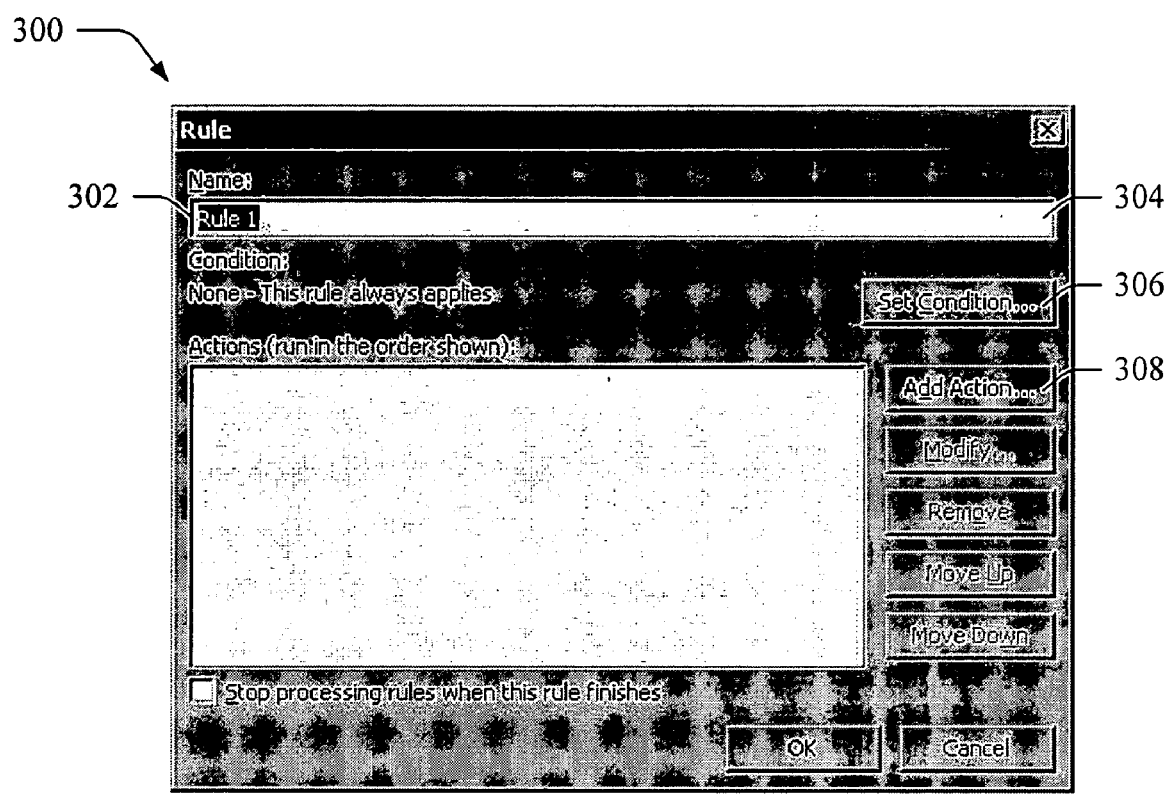
FIG. 3 illustrates an exemplary rule dialog.

Referring to FIG. 3, the dynamic-action builder enables a designer to view his or her progress in building the dynamic action in a dynamic action area and to continue to build the dynamic action by selecting to add or modify a condition or action through this area, here shown with an exemplary rule dialog 300. The rule dialog presents a default title 302 ("Rule 1") for a rule associated with the triggering event for name field 202. The rule dialog enables the designer to select another name for the rule (through name field 304), set a condition (through condition button 306), and add or modify one or more actions (through action button 308).

A condition may be added if a designer wishes to make actions conditional. It can be evaluated when the electronic data-entry form is being run (and thus when a user can be interacting with it) and determines whether the action(s) of the rule are executed.

In one embodiment, a condition is stored as an XML path language (XPath) expression that returns a Boolean value. Thus, if it returns "false" the action or actions of the rule are not performed. XPath expressions buildable by the dynamic-action builder can evaluate data structures (such as nodes of an electronic data-entry form), a string, and the like.

In the illustrated and described embodiment, conditions, whether comprising an XPath expression or otherwise, may comprise: values in an electronic data-entry form; comparison and equality operators for comparing and equating values; constant values, like numbers and strings; calculated values, like those from performance of mathematical functions; pattern matching; a user's current role, rights, and/or identity; and whether the form or part of it is digitally signed.

These conditions can be built to depend on information about a user, such as by finding and analyzing a role or identity of a current user of the electronic data-entry form. Based on this information, a condition may return a Boolean value causing an action to be performed or not performed. An example of this is set forth below in a section entitled "Role-Based Conditions".

Continuing the illustrated embodiment, the designer selects action button 308 of FIG. 3. Responsive to this selection, the dynamic-action builder enables selection of various actions though an action selection area, an example of which is shown with an exemplary action dialog 400 of FIG. 4. The action dialog enables graphical selection of an action for an electronic data-entry form. The action shown as highlighted in the action dialog is dialog box action 402, which can show a dialog box message when the action is performed.

Selectable actions shown in the action dialog comprise: the dialog box action; a dialog box expression action 404; a set a field's value action 406; a query action 408; a submit action 410; and an open a new form action 412.

The dynamic-action builder may enable selection of parameters through a parameter area. It may do so responsive to selection of an action, such as one of these actions 404 through 412. These parameters may be set to govern how an action is to be performed.

The dynamic-action builder may enable, such as through selection of these actions and their parameters, a designer to add actions to an electronic data-entry form that perform the following: present a dialog box to a user having static (e.g., set now) or dynamic (set based on future or internal-to-the-form information) text; switch a current view shown; assign a calculated value to a data-entry field of the form; submit data using a pre-defined data connection; query data using a pre-defined data connection; open a new form, such as from a specified form template; close the current form; enable a digital signature (e.g., based on a role of a current user); and enable selection of a workflow function (e.g., based on a role of a current user). In one embodiment, many of these actions comprise methods, functions, and formulas equivalent to a set of object model calls in a programming language.

Figure 4:
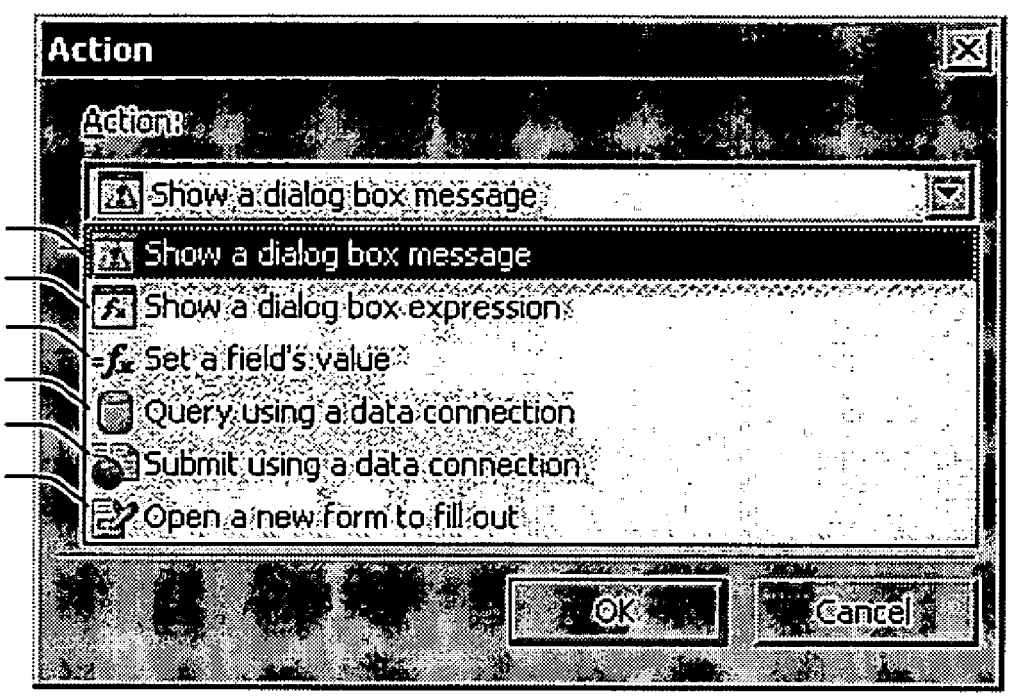
FIG. 4 illustrates an exemplary action dialog.

Continuing the illustrated embodiment, the designer selects the action for setting a field's value (406) of FIG. 4. Responsive to this selection, the dynamic-action builder enables selection of parameters for this action though an exemplary action parameter dialog 500 shown in FIG. 5. This action, as well as some of the other actions, is capable of altering or modifying an arbitrary data structure of electronic data-entry form 112 (e.g., a data-entry field or node). The action chosen is shown in field 502, and selection of two parameters for this action is enabled: a field to be modified through "field" field 504; and a value through "value" field 506.

The dynamic-action builder enables the designer to select a data-entry field of the electronic data-entry form on or about which to perform an action. In this embodiment, the designer is enabled to select which field is to have its value set. The designer can select this field by typing in a expression capable of identifying that field in field 504 or graphically. The user interface can enable the designer to select a data-entry field through the design view 200 of the electronic data-entry form shown in FIG. 2, or through a data source representation of electronic data-entry form.

In the illustrated embodiment, the dynamic-action builder enables the designer to select the field by clicking on a data source selection button 508, after which the dynamic-action builder presents a data source representation of electronic data-entry form 112.

Figure 6:
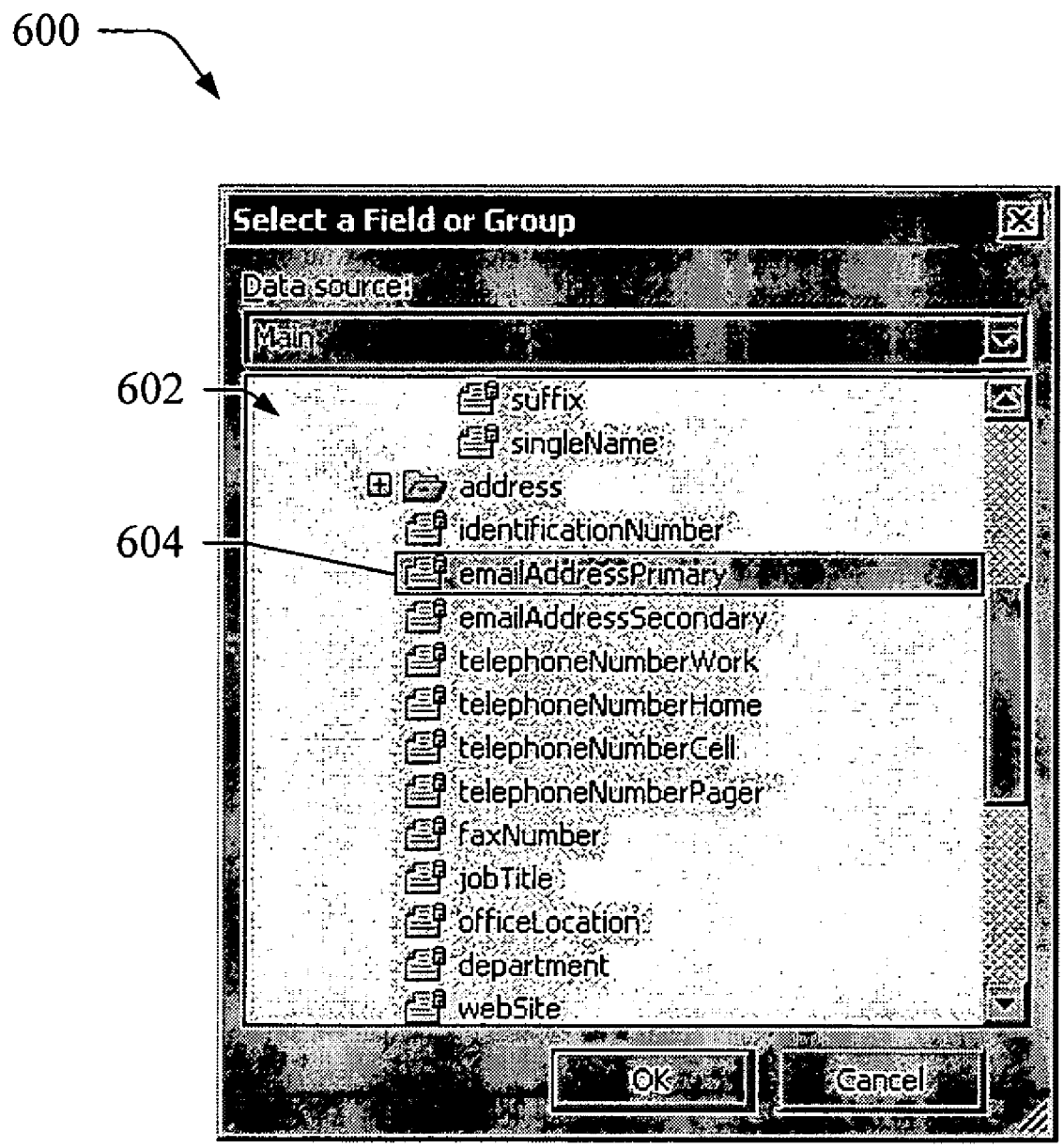
FIG. 6 illustrates an exemplary data-source selector and a hierarchical representation of an electronic data-entry form.

FIG. 6 sets forth an exemplary data-source selector 600 showing a hierarchical representation 602 of the electronic data-entry form. Through this representation, the designer can select the field. Here the designer is shown to have selected the emailAddressPrimary node 604, which corresponds to E-mail address data-entry field 204 shown in FIG. 2.

Figure 7:
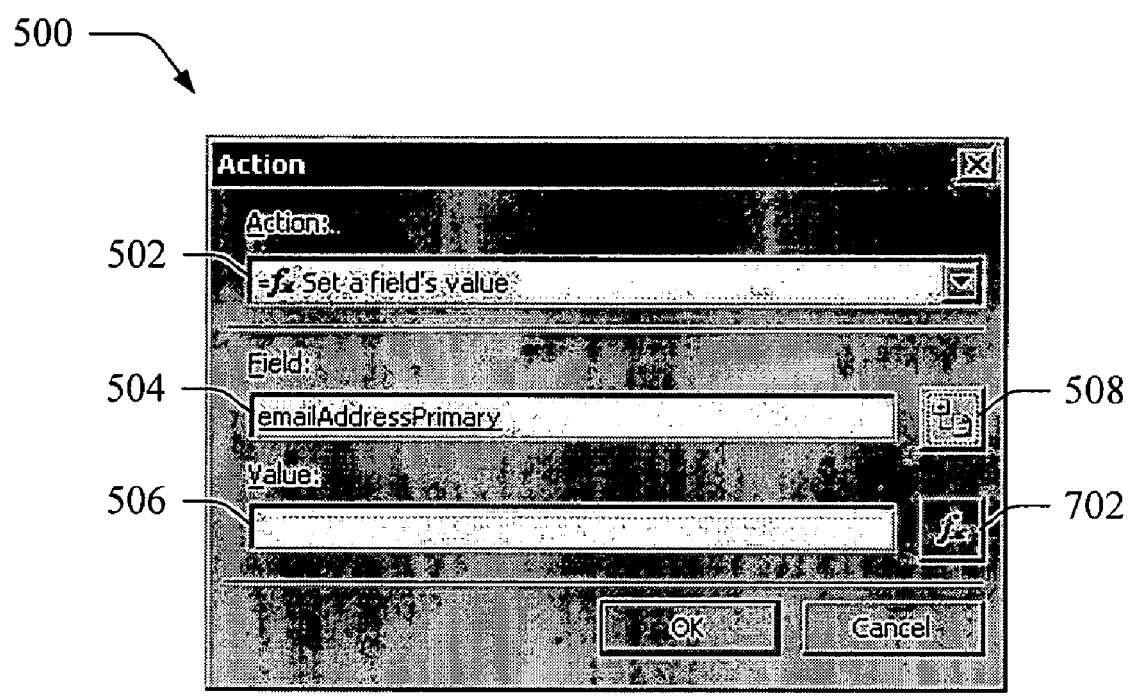
FIG. 7 illustrates a modified view of the action parameter dialog of FIG. 5.

Responsive to this selection, the dynamic-action builder fills the name of the selected field into a modified view of action parameter dialog 500, here shown in FIG. 7.

The dynamic-action builder enables the designer to select the value for the E-Mail Address field 204. The designer is able to enter a fixed value to automatically populate into the E-Mail Address field 204 when the trigging event happens (here when a user changes data in name field 202). In this case, however, the designer select a function button 702 to have the value set for the E-Mail Address field 204 to be set based on a calculation and/or during runtime of the electronic data-entry form.

Figure 8:
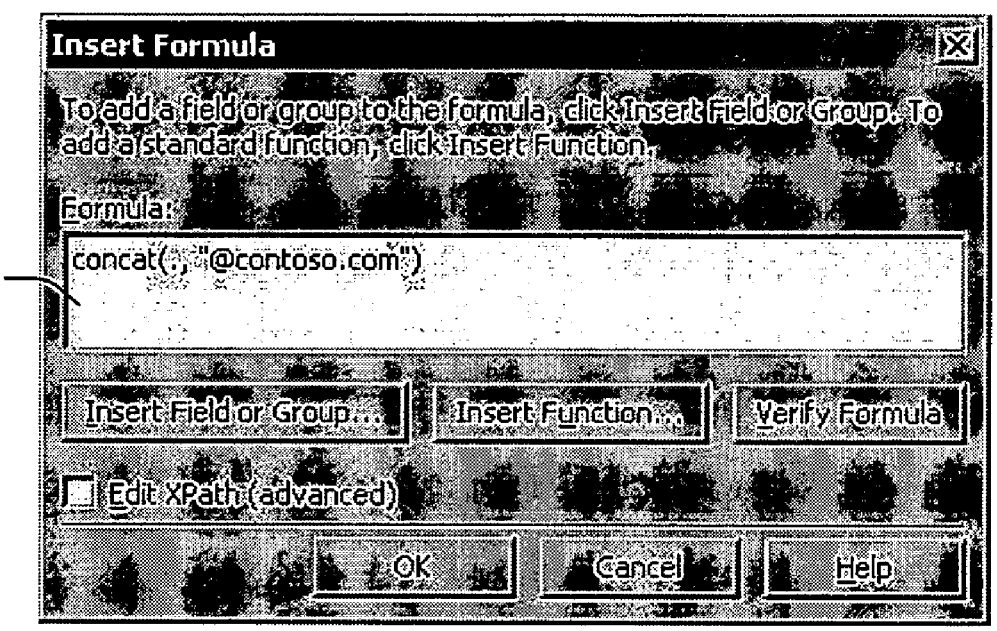
FIG. 8 illustrates an exemplary insert formula dialog.

The dynamic-action builder enables the designer to set this function. In the illustrated embodiment, the dynamic-action builder presents an insert formula dialog 800, shown in FIG. 8. To insert a formula, the designer can select from a pre-set list of formulas (not shown), like a summing function or a concatenation function and many others. In the illustrated embodiment, the designer selected a concatenation function, which the dynamic-action builder presented as "concat(.,"")". This is one manner in which the dynamic-action builder can build functions; some functions are presented needing only a designer to graphically select the function and field(s)/node(s) on which it acts. In this case, the function is presented assuming that the data of the associated data-entry field (here text of the name field) will be concatenated with (combined as a string with) text that the designer can enter between the double quotes. An explanation of how this function can be built may also be provided for the designer.

In the illustrated embodiment, the designer enters "@contoso.com" between the quotation marks. By so doing, the dynamic action built can perform an action that builds an email address based on a name entered into the name field 202. This will be illustrated below.

Figure 5:
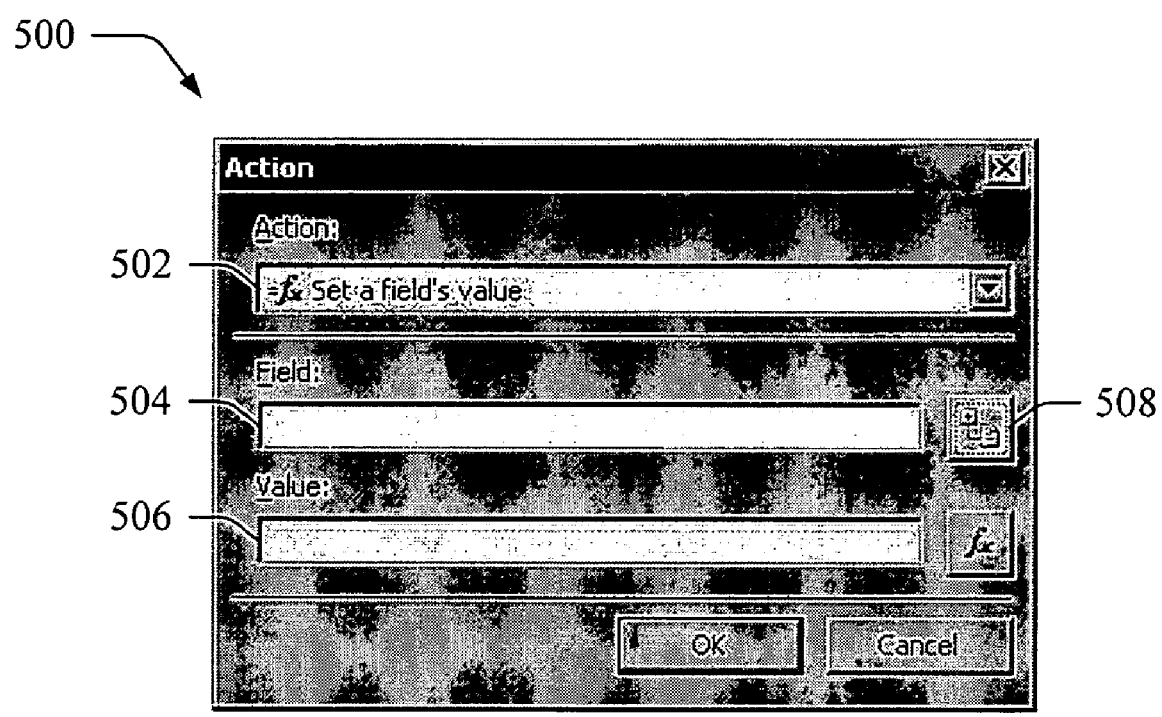
FIG. 5 illustrates an exemplary action parameter dialog.

The dynamic-action builder can present the action parameters fully completed, such as by adding the contents of formula field 802 into value field 506 of FIGS. 5 and 7 (not shown). The dynamic-action builder can also present a dialog showing the triggering event and the rule for the dynamic action once the dynamic action is complete.

Figure 9:
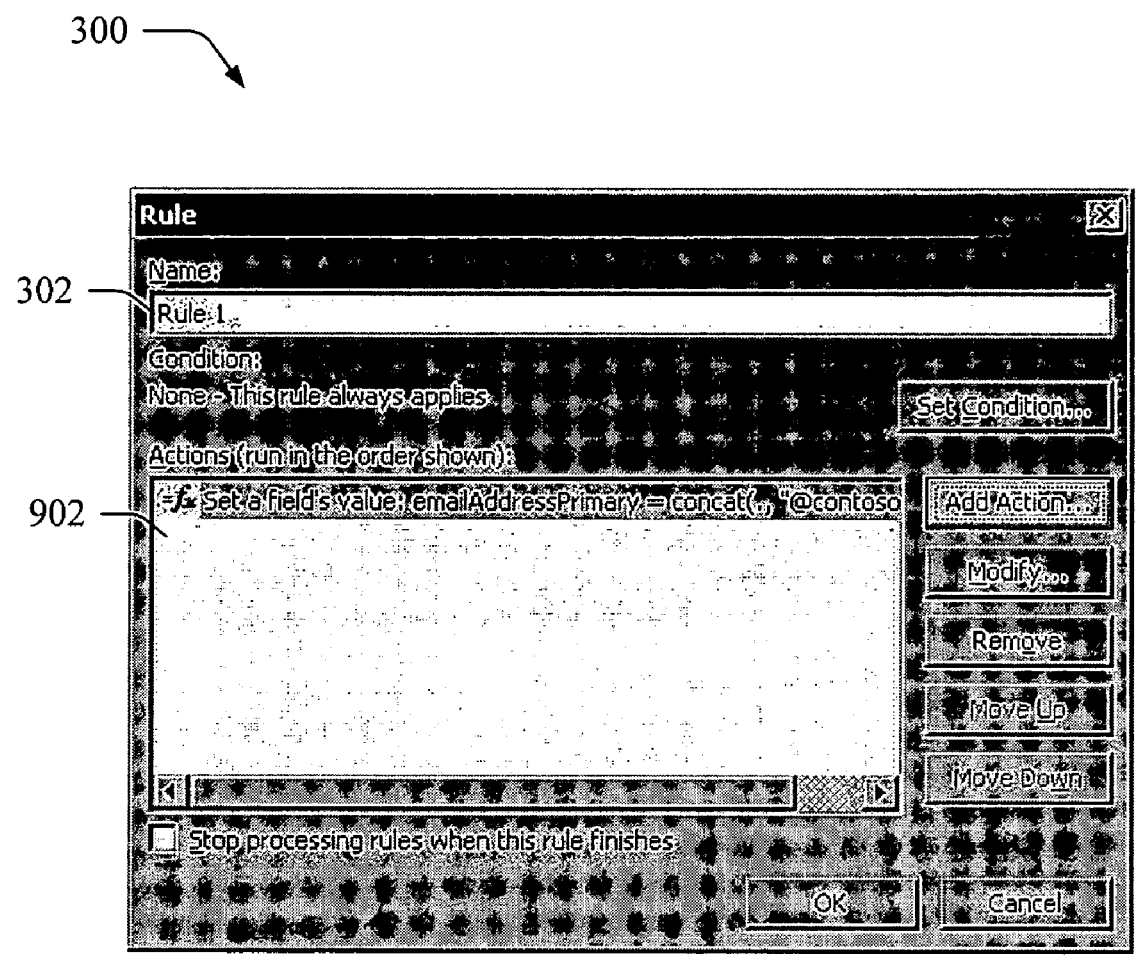
FIG. 9 illustrates an exemplary completed action field of an updated version of the rule dialog of FIG. 3.

In the illustrated embodiment, the dynamic-action builder updates the rule dialog 300 of FIG. 3 to show the action now selected for the rule. FIG. 9 sets forth this action in a completed action field 902 of an updated version of the rule dialog 300. Following this, the designer can add actions or modify the current actions (not shown).

This is but one example of the dynamic-action builder enabling a designer to create a dynamic action for an electronic data-entry form. In this example, the dynamic-action builder creates a declarative syntax for the dynamic action using XML. Thus, the dynamic-action builder generates the following declarative syntax for the above-built dynamic action:

```
<xsf:domEventHandler
 match="/ar:absenceRequest/ar:contact/ar:name/ar:singleName">
    <xsf:ruleSetAction ruleSet="ruleSet_
1"></xsf:ruleSetAction>
</xsf:domEventHandler>
<xsf:ruleSets>
    <xsf:ruleSet name="ruleSet_1">
        <xsf:rule caption="Rule 1">
            <xsf:assignmentAction
targetField="../../ar:emailAddressPrimary"ex-
pression="concat(.,"@contoso.com")"></x
sf:assignmentAction>
        </xsf:rule>
    </xsf:ruleSet>
</xsf:ruleSets>
```

The first four lines above represent the declarative syntax for the triggering event of the dynamic action. This triggering event can apply to multiple rules. The remaining lines represent the declarative syntax for the rule. In this case, the rule comprises the selected set field value action that concatenates "@contoso.com" after the text entered into name field 202 and enters this into the E-Mail Address field 204. This declarative syntax can be stored in or associated with the electronic data-entry form. At runtime it can be converted into executable code, such as into runtime objects internal to the electronic data-entry form.

Continuing the illustrated embodiment, at runtime a user enters data into name data-entry field 202 of electronic data-entry form 112. FIG. 10 sets forth a runtime view 1000 of the form, with the name data-entry field shown with "Ned" entered. Once data of this field is changed, the triggering event of the dynamic action occurs. Then, executable code for the rule is run. With no condition, the action (to set the value for E-mail Address field 204) is performed. This action, as described above, auto-populates the E-mail Address field with a concatenation of the data entered into the name field with "@contoso.com". Thus, "Ned" is combined in a string with "@contoso.com", which is shown as "Ned@contoso.com".

Role-Based Conditions

As mentioned in part above, the tools enable building of dynamic actions with one or more conditions. These conditions can be built to depend on a state of the electronic data-entry form, secondary data (e.g., data from a secondary source like a remote server), or a user of the form. The following discussion focuses on a condition dependent on a user's role. Like other conditions, a condition based on a user's role (e.g., identity or rights) may return a Boolean causing an action to be performed or not performed.

A user's role may comprise information about the user that is capable of affecting some action for the electronic data-entry form. Based on the role of a person currently using the electronic data-entry form, an action or actions may or may not be performed.

Assume, for instance, that four roles are established for potential users of an electronic data-entry form. The first role is a salesman, the second a sales manager, the third a warehouse manager, and the fourth a vice president. If a dynamic action has a load trigger, for instance, the dynamic action's rule may be executed when a user loads the electronic data-entry form. When executed, the rule executes the condition. If the condition is based on the role of the user that opened the electronic data-entry form, an action or actions can be executed based on the user's role. Thus, if one action enables approval buttons and the condition returns a "true" Boolean for the sales manager, the warehouse manager, and the vice president but a "false" Boolean for the salesman, the electronic data-entry form presents an approval button for the managers and vice president but not for the salesman.

Performing (or not performing) actions based on a user's role has many applications. A dialog box directed to a particular individual may be presented when that particular individual opens an electronic data-entry form, changes data in a field, or makes a selection in the form. A digital signature enabled for a particular person or role (like being a manager) may be enabled for a particular person or role but not others. Overriding a built-in constraint, like automatically overriding rejection of an expense report when too much money is entered, may be enabled based on which user opened the form. Conditional actions may also alter how and what an electronic data-entry form presents based on who is viewing the electronic data-entry form. A user that has poor vision for instance, may have a role identifying this disability. An action increasing the font size of the electronic data-entry form may be performed conditional on a user having this disability.

Similarly, actions responsive to which person is viewing an electronic data-entry form may enable client-side workflow. Continuing one example above, if the salesman submits an electronic data-entry form for a purchase order, the sales manager can open that order form and be presented an option to approve the purchase order. Similarly, the vice president can open the same order form and be presented a dialog showing that the salesman is waiting for approval but that the sales manager has not yet approved, for example.

In one embodiment, client-side workflow is enabled without need of a remote data source, like a computer server on the Internet. Continuing the above example, if the salesman, the sales manager, and the vice president each have software capable of running the electronic data-entry form and its dynamic actions and can access the electronic data-entry form (such as by receiving it via email), each is enabled to perform workflow functions on the electronic data-entry form. Similarly, if the salesman, the sales manager, and the vice president each have access to a local data source, like a computer server on a company intranet, each may be enabled to perform workflow functions. Thus, these workflow functions may be tailored for each of the salesman, sales manager, and vice president based on his or her role.

Cascading Condition

In one embodiment, the tools enable dynamic actions with a cascading condition to be built for an electronic data-entry form.

For example, if one dynamic action has a triggering event of an expense data-entry field being changed but is conditional on that expense field having too large a number (without that condition being dependent on some other condition), it may be performed based on one, non-cascading condition. In this case, the action may switch the view if the number in the field is too high, the switched view reading: "your expense number is too high and must be approved by your manager", and having two selectable buttons, one saying "submit for approval" and the other "lower expense to maximum allowed". If the user selects the "lower expense to maximum allowed" another action can set the value of that field (similarly to the example above).

A second dynamic action can rely on a cascading condition by depending on this first dynamic action through its own condition. Assume for example that the second dynamic action is triggered by the user selecting the "submit for approval" button but is conditional on a role-based condition and that its action can present a dialog. This dynamic action may present, if the user is not a manager, a dialog saying "approval requested from manager". It may also request approval of the manager, either actively or by recording that the approval is requested, so that when the manager opens the form the manager may approve or deny the approval request. But this dynamic action can also present a dialog saying "approved" if the current user is a manager. Thus, this second dynamic action has cascading dependencies by depending on the condition of the first dynamic action through its own condition. Through cascading dependencies like this, the tools enable extensive and complex functionality to be added to an electronic data-entry form through dynamic actions.

Process for Building Dynamic Actions

Figure 11:
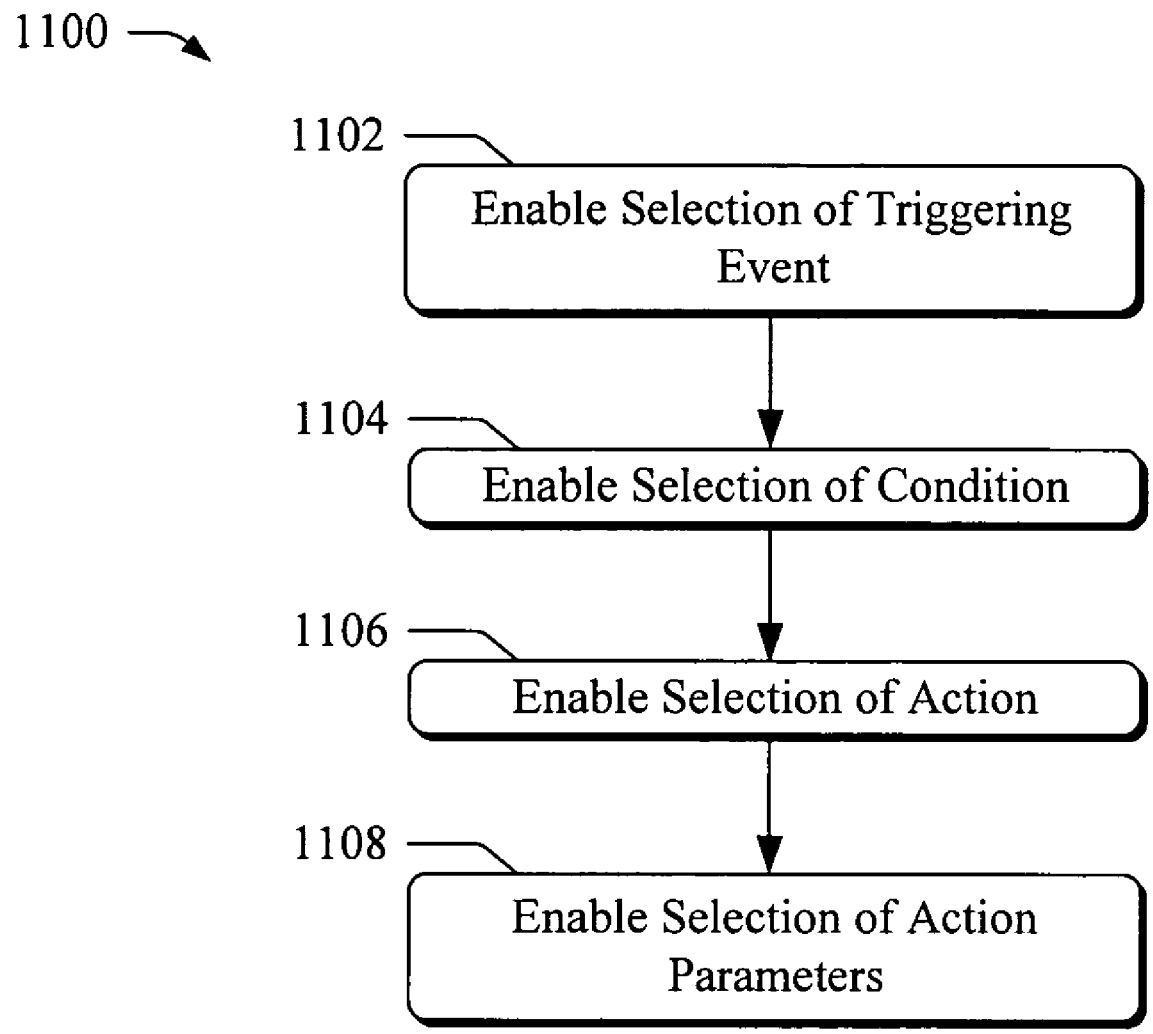
FIG. 11 is a flow diagram of an exemplary process for building a dynamic action for an electronic data-entry form.

FIG. 11 shows a flow diagram for an exemplary process 1100 for building a dynamic action for an electronic data-entry form. Process 1100 is illustrated as a series of blocks representing individual operations or acts performed by elements of the operating environment 100 of FIG. 1, such as the dynamic-action builder 114 and its user interface 116. This and other processing disclosed herein may be implemented in any suitable hardware, software, firmware, or combination thereof; in the case of software and firmware, these processes represent a set of operations implemented as computer-executable instructions stored in computer-readable media 110 and executable by processor 108.

At block 1102, dynamic-action builder 114 enables selection of a triggering event. The dynamic-action builder can enable this selection through a graphical user interface, such as is described in the above examples. As part of this block, the dynamic-action builder enables selection of arbitrary data structures of an electronic data-entry form for triggering events associated with data structures of the electronic data-entry form. This selection may be enabled through graphical selection of the data structure, such as through selection of a data-entry field and/or node corresponding to the data structure. Examples of this are set forth above.

At block 1104, the dynamic-action builder enables selection of a condition. The dynamic-action builder can do so using a graphical user interface, such as set forth in the above-described examples. Types of selectable conditions are also described above.

At block 1106, the dynamic-action builder enables selection of an action. This selection can be through a graphical user interface, such as set forth in the above described example. Actions selected can be added, modified, or deleted. Multiple actions can be selected for each condition and/or triggering event.

At block 1108, the dynamic-action builder enables selection of parameters for the selected action. Parameters for each action may differ. For this reason, the dynamic-action builder can enable selection of parameters associated with the selected action. Selection of parameters may be through a graphical user interface or otherwise, such as set forth above.

The dynamic-action builder may enable creation of additional actions for a selected triggering event, such as by performing blocks 1104, 1106, and/or 1108 one or more additional times.

Executing Dynamic Actions

Figure 12:
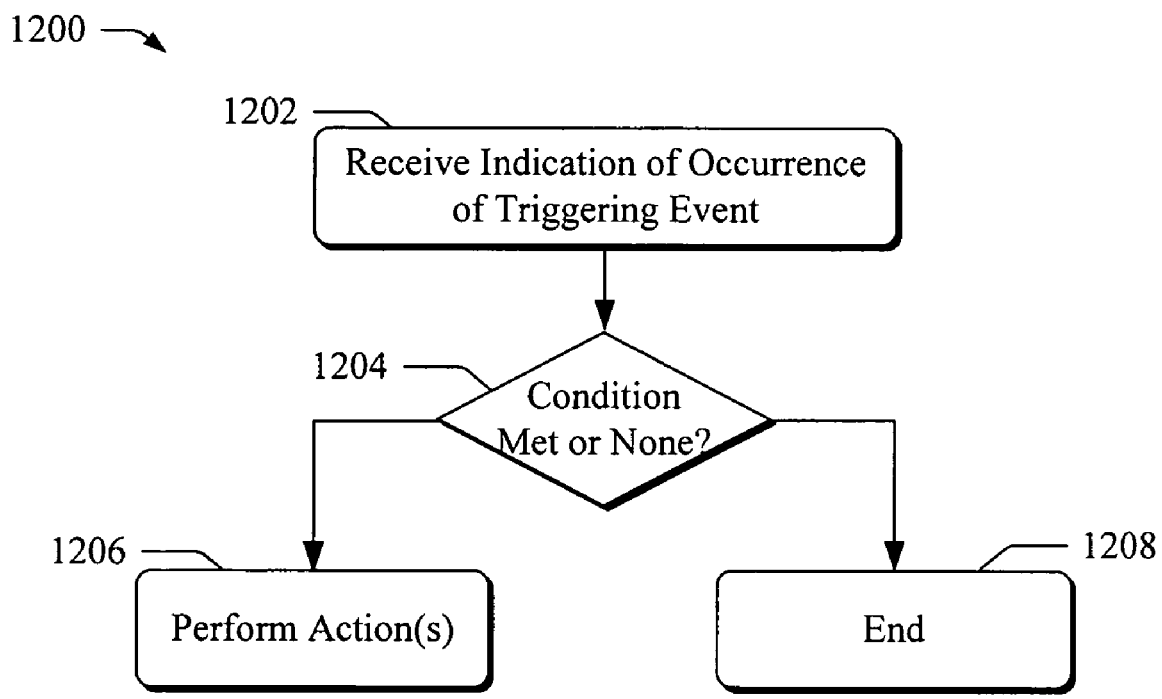
FIG. 12 is a flow diagram of an exemplary process for executing a dynamic action for an electronic data-entry form.

FIG. 12 shows a flow diagram for an exemplary process 1200 for executing a dynamic action for an electronic data-entry form. Process 1200 is illustrated as a series of blocks representing individual operations or acts performed by elements of the operating environment 100 of FIG. 1, such as runtime 118.

At block 1202, the runtime receives an indication that a triggering event has occurred. The triggering event can be caused by a user's interaction with an electronic data-entry form, such as those described above.

At block 1204, the runtime determines whether or not a condition is met or that none exists for a dynamic action triggered by the triggering event. In one embodiment, this is performed by executing a rule that may or may not have a condition. As set forth above, a condition may return a Boolean indicating whether or not the condition is met. If no condition exists or the condition is met, the runtime proceeds along a "Yes" path to block 1206. If a condition exists and is not met, the runtime proceeds along a "No" path to block 1208.

At block 1206 the runtime executes the action (or actions) responsive to occurrence of the triggering event. Examples of actions are set forth above.

At block 1208 the runtime does not execute the action(s) that depends on the unmet condition.

Following performance of blocks 1206 and/or 1208, additional actions (again with or without conditions) may be executed responsive to occurrence of the triggering event of block 1202. In this case, blocks 1204, 1206, and/or 1208 may be repeated for other actions.

CONCLUSION

The above-described systems and methods enable a designer to build a dynamic action for an electronic data-entry form by selecting a triggering event and an action. These systems and methods may also enable a designer to build a dynamic action having a condition, which permits tailoring of the action to a state of the electronic data-entry form, secondary data, or a current user of the form. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. One or more computer storage media having computer-readable instructions therein that, when executed by a computer, cause the computer to perform acts comprising:
   receiving a triggering event of an electronic data-entry form, wherein the triggering event comprises a data change trigger caused by a user modifying data in the electronic data-entry form or a click trigger caused by the user clicking on a button in the electronic data-entry form;
   responsive to the triggering event, determining whether a role of the user of the electronic data-entry form permits performing an action associated with the triggering event; and
   performing the action responsive to the determining that the role of the user permits performance of the action.

2. The media of claim 1, wherein the act of performing the action comprises enabling selection of a digital signature associated with the role of the user.

3. The media of claim 1, wherein the act of performing the action comprises enabling approval of the electronic data-entry form, the approval associated with the role of the user.

4. The media of claim 1, wherein the act of performing the action comprises presenting a user interface tailored to the role of the user.

5. The media of claim 1, wherein the acts of receiving, determining, and performing are performed without communication with a remote data source.

6. The media of claim 1, wherein the role of the user comprises rights associated with the user.

7. The media of claim 1, wherein the computer storage media comprises instructions written in eXtensible Markup Language (XML).

8. A system embodying the computer and the computer storage media of claim 1.

9. One or more computer storage media having computer-readable instructions therein that, when executed by a computer, cause the computer to perform acts comprising:
   receiving a triggering event of an electronic data-entry form, wherein the triggering event comprises a data change trigger caused by a user modifying data in the electronic data-entry form or a click trigger caused by the user clicking on a button in the electronic data-entry form; and
   responsive to the triggering event, determining whether a role of the user permits altering the electronic data entry form, and altering the electronic data-entry form responsive to determining that the role of the user permits altering the electronic data entry form.

10. The media of claim 9, wherein the act of altering comprises presenting a user interface tailored to the role of the current user.

11. The media of claim 9, wherein the computer storage media comprises instructions written in eXtensible Markup Language (XML).

12. A system embodying the computer and the computer storage media of claim 9.

* * * * *